(12) United States Patent
Iwasa

(10) Patent No.: US 11,899,327 B2
(45) Date of Patent: Feb. 13, 2024

(54) OPTICAL NODE DEVICE

(71) Applicant: JVCKENWOOD Corporation, Yokohama (JP)

(72) Inventor: Takayuki Iwasa, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 0 days.

(21) Appl. No.: 18/323,436

(22) Filed: May 25, 2023

(65) Prior Publication Data

US 2023/0296948 A1 Sep. 21, 2023

Related U.S. Application Data

(63) Continuation of application No. PCT/JP2021/041636, filed on Nov. 11, 2021.

(30) Foreign Application Priority Data

| Dec. 4, 2020 | (JP) | ................................ | 2020-201570 |
| Dec. 4, 2020 | (JP) | ................................ | 2020-201571 |
| Dec. 4, 2020 | (JP) | ................................ | 2020-201572 |
| Dec. 4, 2020 | (JP) | ................................ | 2020-201953 |

(51) Int. Cl.
*G02F 1/133* (2006.01)
*G02F 1/1362* (2006.01)
(Continued)

(52) U.S. Cl.
CPC ..... *G02F 1/136286* (2013.01); *G09G 3/3688* (2013.01); *G09G 3/3696* (2013.01);
(Continued)

(58) Field of Classification Search
CPC .......... G02F 1/13; G02F 1/133; G02F 1/1335; G02F 1/133526; G02F 1/133553;
(Continued)

(56) References Cited

U.S. PATENT DOCUMENTS 9,466,253 B2   10/2016   Iwasa
2002/0196243 A1   12/2002   Morita
(Continued)

FOREIGN PATENT DOCUMENTS

JP   06-095621   4/1994
JP   2003-058130   2/2003
(Continued)

OTHER PUBLICATIONS

International Search Report and Written Opinion for International Application No. PCT/JP2021/041636 dated Jan. 11, 2022, 12 pages.

*Primary Examiner* — Thoi V Duong

(74) *Attorney, Agent, or Firm* — Amin, Turocy & Watson, LLP

(57) ABSTRACT

Each of multiple pixels of a spatial light modulator of an optical node device includes: a first switching circuit and a first signal holding circuit that sample and hold normal gradation data or inverted gradation data; and a second switching circuit and a second signal holding circuit that sample the normal or inverted gradation data held in the first signal holding circuit at a common timing to the multiple pixels, hold the normal or inverted gradation data for one subframe period, and apply the normal or inverted gradation data to a reflective electrode. The spatial light modulator drive unit applies alternating current voltage having positive polarity and a negative polarity to liquid crystal by inverting voltage in a common electrode of a liquid crystal display element and supplies a voltage having an amplitude different from an amplitude between the normal and inverted gradation data to the common electrode.

20 Claims, 15 Drawing Sheets

(51) Int. Cl.
   *G02F 1/1335*     (2006.01)
   *G02F 1/1345*     (2006.01)
   *G09G 3/36*       (2006.01)

(52) U.S. Cl.
   CPC .... *G02F 1/13454* (2013.01); *G02F 1/133526* (2013.01); *G02F 1/133553* (2013.01); *G09G 2330/021* (2013.01)

(58) Field of Classification Search
   CPC .. G02F 1/1343; G02F 1/1345; G02F 1/13454; G02F 1/136286; G02F 1/1368; G02F 2203/12; G09G 3/3688; G09G 3/3696; G09G 2330/021
   See application file for complete search history.

(56) References Cited

U.S. PATENT DOCUMENTS

| | | |
|---|---|---|
| 2014/0232706 A1 | 8/2014 | Iwasa |
| 2015/0188656 A1 | 7/2015 | Sakurai |
| 2020/0294458 A1 | 9/2020 | Iwasa |

FOREIGN PATENT DOCUMENTS

| | | |
|---|---|---|
| JP | 2003-344823 | 12/2003 |
| JP | 2008-107378 | 5/2008 |
| JP | 2013-092714 | 5/2013 |
| JP | 5733154 | 6/2015 |
| JP | 2015-156015 | 8/2015 |
| JP | 2015-161836 | 9/2015 |
| JP | 2019-101141 | 6/2019 |

OPTICAL NODE DEVICE

CROSS-REFERENCE TO RELATED APPLICATIONS

This application is a Continuation of PCT International Application No. PCT/JP2021/041636 filed on Nov. 11, 2021 which claims the benefit of priority from Japanese Patent Application No. 2020-201953 filed on Dec. 4, 2020, Japanese Patent Application No. 2020-201570 filed on Dec. 4, 2020, Japanese Patent Application No. 2020-201571 filed on Dec. 4, 2020, and Japanese Patent Application No. 2020-201572 filed on Oct. 30, 2020, the entire contents of all of which are incorporated herein by reference.

FIELD OF THE INVENTION

The present invention relates to an optical node device.

BACKGROUND OF THE INVENTION

Optical networks are used to support modern demands related to high-speed, high-capacity electric communication. These networks utilize as many optical spectra as possible by using a technique known in general as optical wavelength-division multiplexing (WDM).

In many optical networks, optical node devices for branch points of the optical networks are used. Reconfigurable optical add/drop multiplexer (ROADM) devices having reconfigurable add/drop functions are desirably used in optical node devices in many cases.

To implement a ROADM system, a wavelength selective switch (WSS) may be used for routing of any wavelength channel. In a WSS, an optical beam deflection device such as a spatial light modulator may be used, and a wavelength may be selected for deflection to a desired output port. The WSS that utilizes a spatial light modulator using a reflective liquid crystal display device is in use today (Japanese Patent No. 5733154).

In the reflective spatial light modulators mentioned above, burning of a pixel is desirably minimized for higher reliability.

An optical node device is disclosed.

SUMMARY OF THE INVENTION

According to one aspect, there is provided an optical node device, comprising: an input and output unit having an input port on which incident light is incident and an output port from which output light according to each wavelength included in the incident light is output; a wavelength disperser configured to spatially disperse light of each wavelength included in the incident light according to the wavelength and output the output light toward the input and output unit; an optical coupler configured to condense the light of each wavelength dispersed by the wavelength disperser onto a two-dimensional plane for each wavelength and output reflected light of each wavelength to the wavelength disperser; a spatial light modulator that is arranged at a position of the two-dimensional plane, has multiple pixels, and configured to reflect, by representing gradation by the multiple pixels, the light of each wavelength condensed by the optical coupler in directions for each wavelength determined by routing; a spatial light modulator drive unit configured to drive the multiple pixels of the spatial light modulator; and a common electrode which is divided into a first common electrode of a first portion on which light is incident and a second common electrode of a second portion on which light is not incident, wherein the gradation is formed by inputting normal gradation data in one subframe period of multiple subframe periods which are obtained by dividing one frame period and inverted gradation data in another subframe period of the multiple subframe periods into each of the multiple pixels by the spatial light modulator drive unit, each of the multiple pixels comprises: a first switching circuit configured to sample the normal gradation data or the inverted gradation data from a data line; a first signal holding circuit configured to hold the normal gradation data or the inverted gradation data sampled by the first switching circuit; a second switching circuit configured to sample, at a common timing to all of the multiple pixels, the normal gradation data or the inverted gradation data held in the first signal holding circuit; and a second signal holding circuit configured to hold, for one subframe period, the normal gradation data or the inverted gradation data sampled by the second switching circuit and apply the normal gradation data or the inverted gradation data to a reflective electrode of a liquid crystal display element, and the spatial light modulator drive unit is further configured to: in the first portion, apply alternating current voltage having a positive polarity and a negative polarity to a liquid crystal of the liquid crystal display element by inverting a voltage in the first common electrode of the liquid crystal display element at the common timing; and supply a voltage having an amplitude different from an amplitude between the normal gradation data and the inverted gradation data to the first common electrode, and in the second portion, voltages of the reflective electrode and the second common electrode are inverted every several subframes of a predetermined number.

The above and other objects, features, advantages and technical and industrial significance of this application will be better understood by reading the following detailed description of presently preferred embodiments of the application, when considered in connection with the accompanying drawings.

DETAILED DESCRIPTION OF THE INVENTION

Embodiments will be described hereinafter in detail, based on the drawings. Embodiments are not limited by the embodiments described hereinafter. Furthermore, components in the following embodiments include those easily substitutable by persons skilled in the art or those that are substantially the same.

First Embodiment

Figure 1:
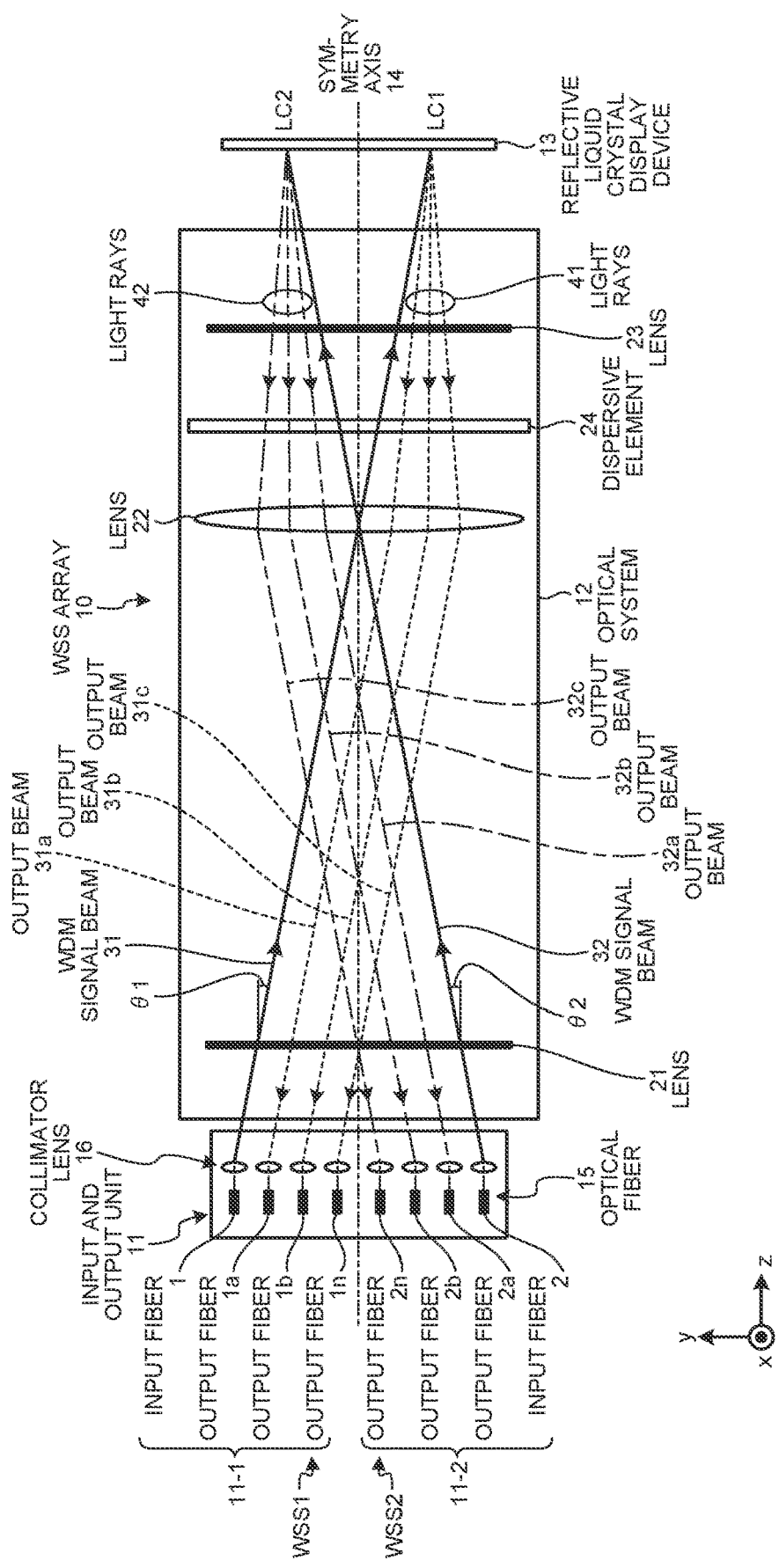
FIG. 1 is a diagram illustrating a configuration of a wavelength selective switch array according to a first embodiment.
Figure 2:
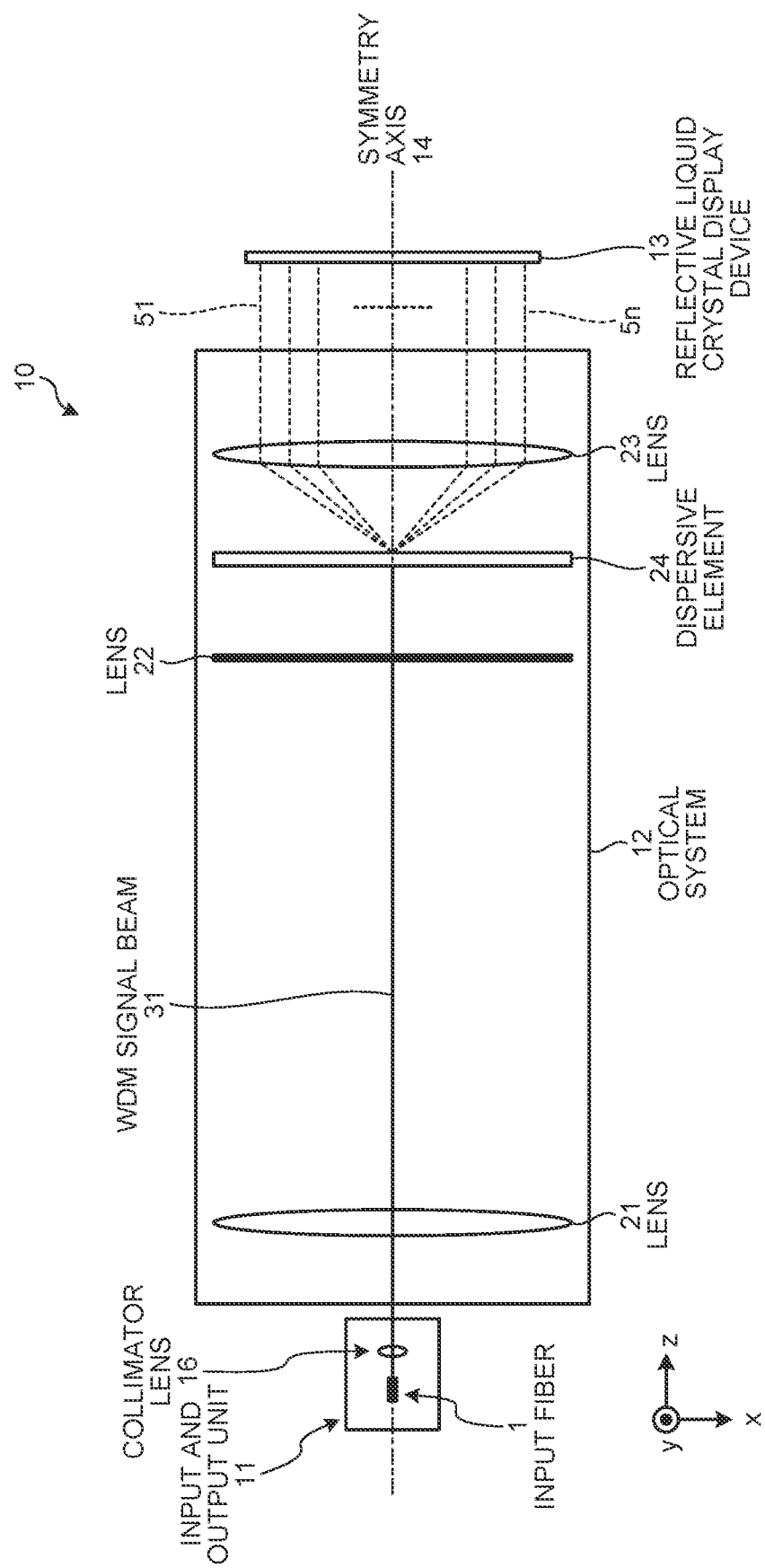
FIG. 2 is a diagram illustrating the configuration of the wavelength selective switch array according to the first embodiment.

FIG. 1 and FIG. 2 are diagrams illustrating a configuration of a wavelength selective switch (WSS) array according to a first embodiment. FIG. 1 is a diagram of a WSS array 10 as viewed in a direction opposite to an x-axis direction. FIG. 2 is a diagram of the WSS array 10 as viewed in a direction opposite to a y-axis direction.

The WSS array 10 corresponds to an example of an "optical node device" of the present application.

The WSS array 10 of the present application has at least two WSSs used in a single package. The WSS array of the present application enables independent operation of each of these WSSs in the WSS array 10 without need for dedicated optical elements. In fact, many of optical elements can be shared among the WSS devices and cost reduction and downsizing are therefore possible. Such devices are ideally suitable for use, as, for example, reconfigurable optical add/drop multiplexers (ROADMs), in modern communication networks. Furthermore, one or multiple arrays each having two WSSs coupled to each other may be ideally suitable as a component or components in a branch node using a route and select (RS) architecture.

With reference to FIG. 1, the WSS array 10 includes two independent WSS devices WSS1 and WSS2 that are each capable of operating as an independent WSS device. In the present application, the term, "independent", refers to a function of the WSS device WSS1 that independently processes one or plural WDM signals regardless of the WSS device WSS2, and vice versa. In the present application, a term, "processing" is used broadly, and includes, for example, modulating, attenuating, blocking, changing directions of, and/or switching over individual wavelength channels forming each WDM signal.

The WSS array 10 includes an input and output unit 11 and an optical system 12. The optical system 12 is configured to implement beam shaping of each WDM signal beam. Furthermore, the optical system 12 is configured to implement spectral dispersion (demultiplexing) of each WDM signal into wavelength channels (or groups of wavelength channels) forming the WDM signal. In addition, the optical system 12 is configured to implement spectral coupling (multiplexing) of the dispersed wavelength channels (or the groups of the wavelength channels) into one or multiple WDM signals. Furthermore, the WSS array 10 includes a reflective liquid crystal display device 13. The reflective liquid crystal display device 13 is configured to optically process the dispersed wavelength channels in order to change a direction of each of the individual wavelength channels along a predetermined route in the WSS array 10, for example.

The reflective liquid crystal display device 13 corresponds to an example of a "liquid crystal display device" of the present application. The reflective liquid crystal display device 13 will be described in detail after a second embodiment.

The WSS array 10 enables the single optical system 12 and the single reflective liquid crystal display device 13 to be shared by some of the WSS devices of the WSS array 10, the WSS devices WSS1 and WSS2 in this example, by use of an architecture symmetrical with respect to a symmetry axis 14. However, while the WSS devices WSS1 and WSS2 are able to share many of the same optical parts, the architecture of the first embodiment enables the WSS devices WSS1 and WSS2 of the WSS array 10 to be independently controllable devices. Therefore, the WSS array 10 of the first embodiment is downsized and reduced in optical complexity. Additionally, the WSS array 10 provides a multi WSS device having independent processing capacity specific to a device that is more large-sized and requires a high cost.

In the present application, the input and output unit 11 may include certain numbers of input ports and output ports for transmitting one or multiple optical WDM signals. For example, the device may include certain numbers of optical fibers and planar waveguides, and each of these may be assigned as an input port or an output port. In the first embodiment described hereinafter, the input ports or the output ports are implemented as optical fibers 15. However, without departing from the scope of the present application, any other type of a port may be used.

The input and output unit 11 includes an input and output unit 11-1 for the WSS device WSS1. The input and output unit 11-1 includes an input fiber 1 and some output fibers 1a, 1b, . . . , 1n. Herein, n is a natural number. The input and output unit 11 further includes an input and output unit 11-2 for the WSS device WSS2. The input and output unit 11-2 includes an input fiber 2 and some output fibers 2a, 2b, . . . , 2n. Herein, n is a natural number. Therefore, FIG. 1 illustrates, as an example, an array of two 1×n WSS devices including the WSS devices WSS1 and WSS2. In other words, the input and output unit 11 of the WSS array 10 includes an array of the input fiber 1, the output fibers 1a, 1b, . . . , 1n, the input fiber 2, and the output fibers 2a, 2b, . . . , 2n forming an optical fiber stack arranged along the y-axis direction.

The input and output unit 11 further includes an array of collimator lenses 16 in a form of a microlens array. The array of the collimator lenses 16 is arranged in front (a z-direction)

of an array of corresponding optical power elements, for example, in front of the output unit and/or the input unit of the optical fibers. In the present application, the collimator lenses 16 include any optical element capable of inducing and/or changing a direction of an optical beam, and/or condensing a set of light rays. A first group including the input fiber 1 and the output fibers 1a, 1b, . . . , 1n is combined with a first group of the collimator lenses 16 to form the input and output unit 11-1 of the WSS device WSS1. A second group including the input fiber 2 and the output fibers 2a, 2b, . . . , 2n is combined with a second group of the collimator lenses 16 to form the input and output unit 11-2 of the WSS device WSS2. FIG. 1 illustrates the WSS array implemented as the microlens array, but without departing from the scope of the present application, another type of WSS array may be used.

In the present application, for example, optical axes of the optical fibers of the first group are displaced from optical axes of the collimator lenses 16 of the first group. Due to this relative displacement between the array of the input port and the output ports and the array of the collimator lenses 16, the input beam and the output beams of the first group are transmitted such that the input beam enter the optical system 12 and the out beams exit the optical system 12 at an angle $\theta 1$ with respect to the symmetry axis 14. The group of the input beam and the output beams of the WSS device WSS1 is thereby transmitted along the angle $\theta 1$ in a downward direction as a whole (a direction opposite to the y-axis direction).

Similarly, optical axes of the optical fibers of the second group are displaced from optical axes of the collimator lenses 16 of the second group. The input beam and the output beams of the second group are transmitted such that the input beam enter the optical system 12 and the out beams exit the optical system 12 of the WSS device WSS2 is thereby transmitted along the angle $\theta 2$ in an upward direction as a whole (the y-axis direction).

As described above, the example illustrated in FIG. 1 is the WSS array 10 in which two 1×n WSSs, that is, the WSS devices WSS1 and WSS2, are used. Therefore, in the example illustrated in FIG. 1, the WSS array 10 includes the single input fiber 1 that inputs a WDM signal beam 31 into the device and the single input fiber 2 that inputs a WDM signal beam 32 into the device. The input fiber/output fiber configuration illustrated herein is just illustrated for a purpose of illustrating an example and is not intended to limit the scope of the present application. Rather, any useful input port/output port combination may be used without departing from the scope of the present application.

The WDM signal beam 31 is transmitted from the input fiber 1 to the device, passes through the collimator lens 16, and thereafter travels through the optical system 12 at the angle $\theta 1$ in a y-z plane. The WDM signal beam 31 thereafter enters a lens 21 for shaping the WDM signal beam 31 in an x-direction. For example, the lens 21 may be a cylindrical lens having a cylindrical axis extending along a y-direction. Therefore, when viewed from the viewpoint as illustrated in FIG. 1, the lens 21 has no influence on the WDM signal beam 31.

After passing through the lens 21, the WDM signal beam 31 enters a lens 22. In the example illustrated in FIG. 1, the lens 22 may be a cylindrical lens having a cylindrical axis extending along the x-direction. An effect of the lens 22 is dependent on the reflective liquid crystal display device 13 positioned on a focal plane of the lens 22. Furthermore, the lens 22 has its center (the cylindrical axis) on the symmetry axis 14. Since the reflective liquid crystal display device 13 is positioned on the focal plane of the lens 22, any set of collimated light rays entering the lens 22 is condensed to the same height on the reflective liquid crystal display device 13. Conversely, any set of light rays starting from the same height on the reflective liquid crystal display device 13 is output from the lens 22 as a set of collimated light rays.

For example, as illustrated in FIG. 1, any incident beam (for example, the WDM signal beam 31) traveling along the angle $\theta 1$ is directed by the lens 22 to head to a position LC1 on a y-axis on the reflective liquid crystal display device 13. Conversely, a group of light rays 41 starting from the position LC1 on the reflective liquid crystal display device 13 is output from the lens 22 as collimated light rays traveling at the same angle $\theta 1$ as illustrated in FIG. 1. Similarly, any incident beam (for example, the WDM signal beam 32) traveling along the angle $\theta 2$ is directed by the lens 22 to head to a position LC2 on the y-axis on the reflective liquid crystal display device 13. Conversely, a group of light rays 42 starting from the position LC2 on the reflective liquid crystal display device 13 is output from the lens 22 as collimated light rays traveling at the same angle $\theta 2$ as illustrated in FIG. 1.

As to the propagation of the WDM signal beam 31 passing through the optical system 12, after passing through the lens 22, the WDM signal beam 31 passes through a dispersive element 24 that causes an angular dispersion of the wavelength channels of the WDM signal beam 31, as illustrated in FIG. 1 and FIG. 2. In the present application, the dispersive element 24 may be a transmission optical component, such as a diffraction grating or a prism.

The dispersive element 24 corresponds to an example of a "wavelength disperser" of the present application.

After passing through the dispersive element 24, as illustrated in FIG. 1 and FIG. 2, the dispersed wavelength channels pass through a lens 23 that condenses each of the dispersed wavelength channels onto the surface of the reflective liquid crystal display device 13. In the present application, the lens 23 may be a cylindrical lens.

This lens 23 corresponds to an example of an "optical coupler" of the present application.

The reflective liquid crystal display device 13 is a two-dimensional pixelation optical element, for example, a pixelation spatial light modulator. As described in more detail hereinafter, the two-dimensional pixelation optical element is capable of reflecting or changing a direction or directions of one or multiple ones of the dispersed wavelength channels so that the one or multiple ones of the dispersed wavelength channels is/are routed to any one of the output fibers.

As to the WSS device WSS1, according to the present application, since there is the lens 22, all of the light rays starting from the position LC1 on the reflective liquid crystal display device 13 are output from the lens 22 along the angle $\theta 1$ as illustrated in FIG. 1. However, all of the light rays starting from the position LC1 on the reflective liquid crystal display device 13 are displaced from one another by amounts according to their deflection angles from the reflective liquid crystal display device 13. Therefore, in a case in which the deflection angles are appropriately set, each of the output light rays that are reflected can be routed to any output fiber of the output fibers 1a, 1b, . . . , 1n. The reflected output light rays are, for example, reflected output light rays corresponding to the group of the light rays 41 each of which may include one or multiple ones of the wavelength channels of the WDM signal beam 31. Furthermore, in the present application, each of the collimator lenses 16 is displaced at the corresponding output fiber by the same amount, and each of the output beams is thus able to be recoupled to each of the output fibers in a state in which an efficiency thereof has been improved.

Similarly, as to the WSS device WSS2, according to the present application, since there is the lens 22, all of the light rays starting from the position LC2 on the reflective liquid crystal display device 13 are output from the lens 22 along the angle θ2 as illustrated in FIG. 1. However, all of the light rays starting from the position LC2 on the reflective liquid crystal display device 13 are displaced from one another by amounts according to their deflection angles from the reflective liquid crystal display device 13. Therefore, in a case in which the deflection angles are appropriately set, each of the output light rays that are reflected can be routed to any output fiber of the output fibers 2a, 2b, ..., 2n. The reflected output light rays are, for example, reflected output light rays corresponding to the group of the light rays 42 each of which may include one or multiple ones of the wavelength channels of the WDM signal beam 32. Furthermore, in the present application, each of the collimator lenses 16 is displaced at the corresponding output fiber by the same amount, and each of the output beams is thus able to be recoupled to each of the output fibers in a state in which an efficiency thereof has been improved.

Therefore, a combination of the input and output unit 11 and the lens 22 transmits given sets of beams along given angles (for example, in the case of the WSS device WSS1, the angle θ1, and in the case of the WSS device WSS2, the angle θ2). Thereafter, the combination of the input and output unit 11 and the lens 22 serves as a WSS array device that directs these beams to head to positions (the position LC1 and the position LC2) on the reflective liquid crystal display device 13 dependent only on input angles. Therefore, the WSS array 10 enables two sets to share the same optical system 12 and the reflective liquid crystal display device 13, the two sets being: the WDM signal beams 31 and 32 from the WSS devices WSS1 and WSS2; or the light rays 41 and 42 to the WSS devices WSS1 and WSS2. At the same time, the WSS array 10 has capability of a WSS array that separately processes each of the wavelength channels.

In FIG. 2, the stacks of fibers and microlenses forming the input and output unit 11 are being observed from the top of the fiber stack and only the input fiber 1 is thus visible with its corresponding collimator lens 16. The description hereinafter is focused on the WSS device WSS1 but due to symmetry of the system, the same explanation applies to the WSS device WSS2.

As described above, in the case of the WSS device WSS1, the WDM signal beam 31 is input to the system via the input fiber 1. In FIG. 2, the angle θ1 is not visible because the angle θ1 is along a direction of going into the plane of paper. In the present application, the WDM signal beam 31 includes some wavelength channels, and the channels have a wavelength range from a longest wavelength λ1 to a shortest wavelength λn. In some examples, there may be many wavelength channels, and for example, there may be 96 wavelength channels having 50 GHz or 100 GHz intervals on a fixed grating. In another example, a device may be used in an adaptive grating system in which, for example, a frequency interval of 12.5 GHz can be used and 97 or more wavelength channels, for example, 130 or more wavelength channels are available.

The WDM signal beam 31 enters the lens 21 first. The lens 21 functions to expand the beam to a diameter suitable for achieving a desired beam size on the dispersive element 24. For example, the collimator lens 16 and the lens 21 may function as a beam expansion telescope. In the present application, the dispersive element 24 functions to cause an angular dispersion of the wavelength channels of the WDM signal beam 31 in the x-axis direction, as illustrated in FIG. 2. Each of wavelength channels 51 to 5n is angularly dispersed in the x-axis direction by the dispersive element 24, and is thereafter condensed onto the surface of the reflective liquid crystal display device 13 by the lens 23. The wavelength channels 51 to 5n are thereby spatially dispersed in a wavelength dispersion direction (x-axis direction) on the reflective liquid crystal display device 13 according to the wavelengths.

Figure 3:
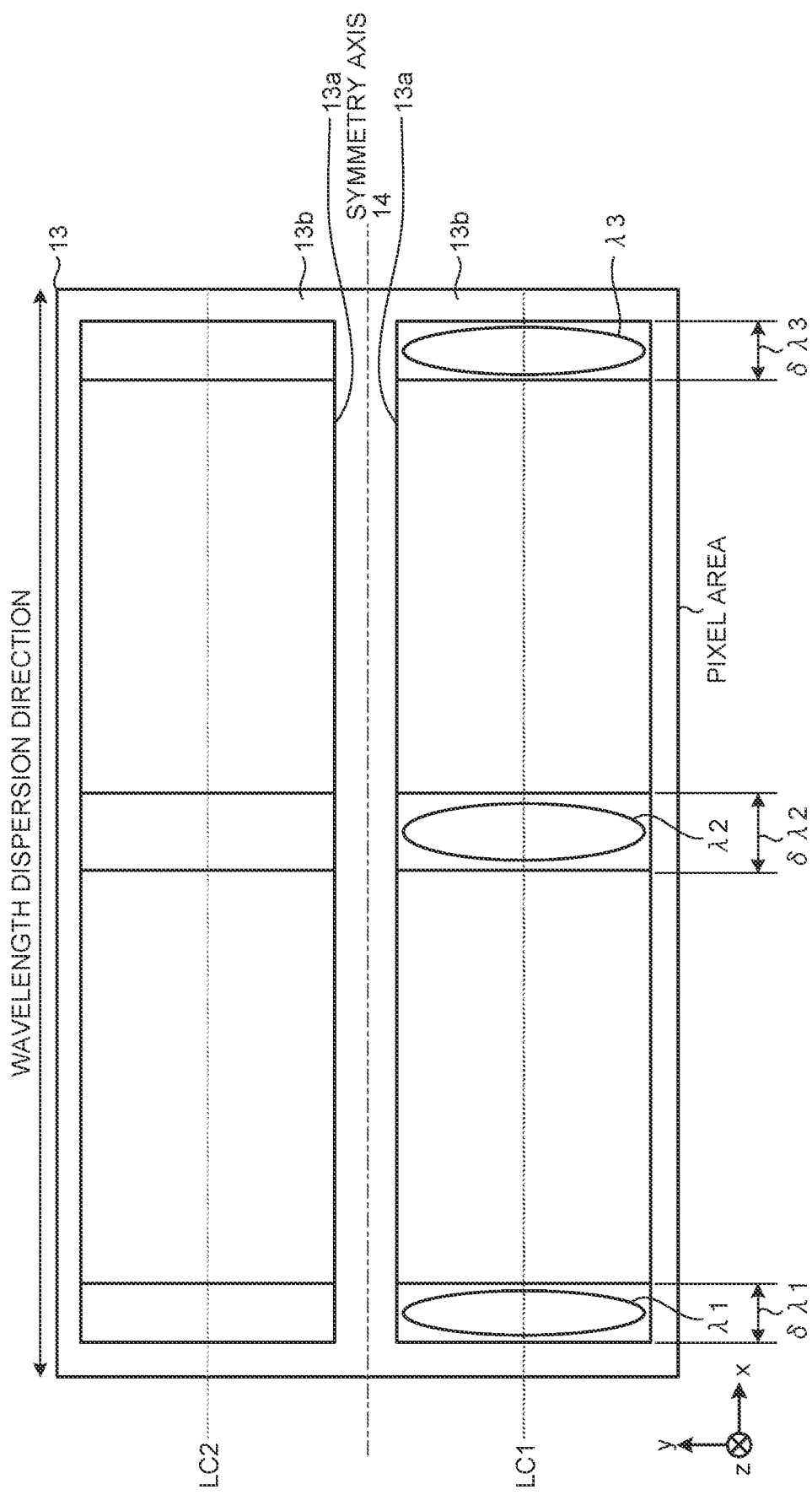
FIG. 3 is a diagram illustrating a reflective liquid crystal display device of a wavelength selective array of the first embodiment.

FIG. 3 is a diagram illustrating a reflective liquid crystal display device of a WSS array according to the first embodiment. FIG. 3 is a diagram of the reflective liquid crystal display device 13 as viewed from a z-axis direction.

An example of the distribution of the wavelength channels on the surface of the reflective liquid crystal display device 13 is more clearly illustrated in FIG. 3. More generally, the wavelength channels may be arranged as long strips or oval spots on a two-dimensional surface of the reflective liquid crystal display device 13. Concisely stated, the wavelength channels are processed as discrete wavelength signals that may be independently affected by the reflective liquid crystal display device 13. However, in the present application, the reflective liquid crystal display device 13 does not necessarily affect each of the wavelength channels and may affect a group of the wavelength channels. Furthermore, as illustrated in FIG. 3, each of the wavelength channel or the group of the wavelength channels do not necessarily have a fixed bandwidth. This is because the reflective liquid crystal display device 13 is able to be implemented as a spatial light modulator that is dynamically completely reconfigurable. Therefore, the present application may be implemented in an existing fixed grating architecture and/or an existing or a future-developed highly adaptive grating architecture.

With reference to FIG. 2 again, the reflective liquid crystal display device 13 selectively changes the direction or directions of one or multiple ones of the wavelength channels 51 to 5n in a certain direction or directions. The reflective liquid crystal display device 13 is capable of changing the direction or directions of a selected one or multiple selected ones of the wavelength channels 51 to 5n so that it is or they are ultimately directed to one or multiple output ports (for example, one or multiple output fibers (see FIG. 1) that are inside the plane of paper of FIG. 2). In the case illustrated in FIG. 2, the direction change achieved by the reflective liquid crystal display device 13 is implemented along an angle positioned on a plane (the y-z plane) orthogonal to the plane of paper. The directions of the wavelength channels 51 to 5n are changed, for example, as described and stated in more detail already by reference to FIG. 1. The wavelength channels 51 to 5n that have been changed in their directions enter the lens 23 again after being reflected by the reflective liquid crystal display device 13, are further changed in their directions to reach the dispersive element 24, and are recoupled at the dispersive element 24. For example, the wavelength channels 51 to 5n changed in their directions along the same angle are recoupled into a single beam, and this single beam is thereafter changed in the direction along a direction enabling output of a processed signal from one of the output ports.

For example, the WDM signal beam 31 including three WDM channels respectively having wavelengths λ1, λ2, and λ3 and channel bandwidths δλ1, δλ2, and δλ3 will be discussed herein. In the example illustrated in FIG. 1, the WDM signal beam 31 enters the system at the angle θ1.

Furthermore, the WDM signal beam 31 traveling at the angle θ1 passes through the center of the lens 22 and is not deflected away from the angle θ1. After passing through the dispersive element 24, the three wavelength channels of the WDM signal beam 31 are angularly dispersed in an orthogonal plane (an x-z plane) but all of the angularly dispersed channels still continue to travel at the angle θ1. These three dispersed wavelength channels are thereafter condensed to different positions on the reflective liquid crystal display device 13 by the lens 23, as illustrated in FIG. 3.

Concerning a routing function of the device, a combination of some different routings is possible herein. For example, a case in which all of the three wavelength channels are desirably routed to the output fiber 1$n$ illustrated in FIG. 1 will be discussed herein. The corresponding portions on the reflective liquid crystal display device 13 deflect the wavelength channels having the wavelengths λ1, λ2, and λ3 so that each of the wavelength channels having the wavelengths λ1, λ2, and λ3 is returned along one of the light rays 41 illustrated in FIG. 1. An effect of the dispersive element 24 on return routes of these wavelength channels is to recouple (multiplex) the wavelength channels into the same beam currently being propagated. This coupled beam is changed in the direction by the lens 22 to have the angle θ1, and thereafter propagates along an output beam 31$c$ that has already been displaced from the WDM signal beam 31. An effect of the collimator lens 16 is to couple the output beam 31$c$, that has been recoupled and changed in the direction, to the output fiber 1$n$. In this operation mode, an effect of the WSS device WSS1 is thus to cause all of the three wavelength channels of the WDM signal beam 31 to travel from the input fiber 1 to the output fiber 1$n$.

In another example, in some cases, some of the wavelength channels may be desired to be routed separately to different output fibers. For example, in some cases, the reflective liquid crystal display device 13 deflects the wavelength channel of the wavelength λ1 along an output beam 31$a$, deflects the wavelength channel of the wavelength λ2 along an output beam 31$b$, and deflects the wavelength channel of the wavelength λ3 along the output beam 31$c$. An effect of the dispersive element 24 in this example is also to change the direction of each of these output beams. However, in this case, instead of recoupling the output beams into a single beam, the dispersive element 24 generates three output beams that travel by spreading out in a fan-like form. Furthermore, each of these output beams starts from the same position LC1 on the y-axis on the reflective liquid crystal display device 13, and these output beams are thus output from the lens 22 as a set of collimated light rays propagating along the same angle θ1 as the original WDM signal beam 31. However, the output beams enter the lens 22 at different heights (different positions on the y-axis) and are thus displaced from each other. As a result, the wavelength channel of the wavelength λ1 propagates along the output beam 31$a$, the wavelength channel of the wavelength λ2 propagates along the output beam 31$b$, and the wavelength channel of the wavelength λ3 propagates along the output beam 31$c$, for example. Therefore, in this configuration, an effect of the WSS device WSS1 is to route the wavelength channel of the wavelength λ1 from the input fiber 1 to the output fiber 1$a$. Furthermore, an effect of the WSS device WSS1 is to route the wavelength channel of the wavelength λ2 from the input fiber 1 to the output fiber 1$b$. In addition, an effect of the WSS device WSS1 is to route the wavelength channel of the wavelength λ3 from the input fiber 1 to the output fiber 1$n$.

In view of the above, it is evident that any wavelength channel of a WDM signal beam is able to be routed to any output fibers as required, in the WSS array of the present application. Furthermore, due to the symmetry of the system illustrated in FIG. 1, the above description similarly applies to use of the WSS device WSS2 for routing of the WDM signal beam 32 (32$a$, 32$b$, 32$c$). This is because, as illustrated in FIG. 3, the dispersed wavelength channels in the WSS devices WSS1 and WSS2 are eventually condensed respectively to different portions on the reflective liquid crystal display device 13. Furthermore, it can be understood that although a single input port and n output ports are used in the example illustrated in FIG. 1 to FIG. 3, any of the output ports may be reconfigured as an input port or input ports, and vice versa. In addition, without departing from the scope of the present application, any numbers of input ports and output ports may be used. Similarly, the example explicitly illustrated in FIG. 1 to FIG. 3 is the WSS array where the two WSS devices WSS1 and WSS2 are used, but without departing from the scope of the present application, any number of WSS devices may be used. For example, in a case in which the input and output unit 11 is designed to use four distinct transmitting angles, the WSS array 10 may provide four independent WSS devices.

Second Embodiment

Figure 4:
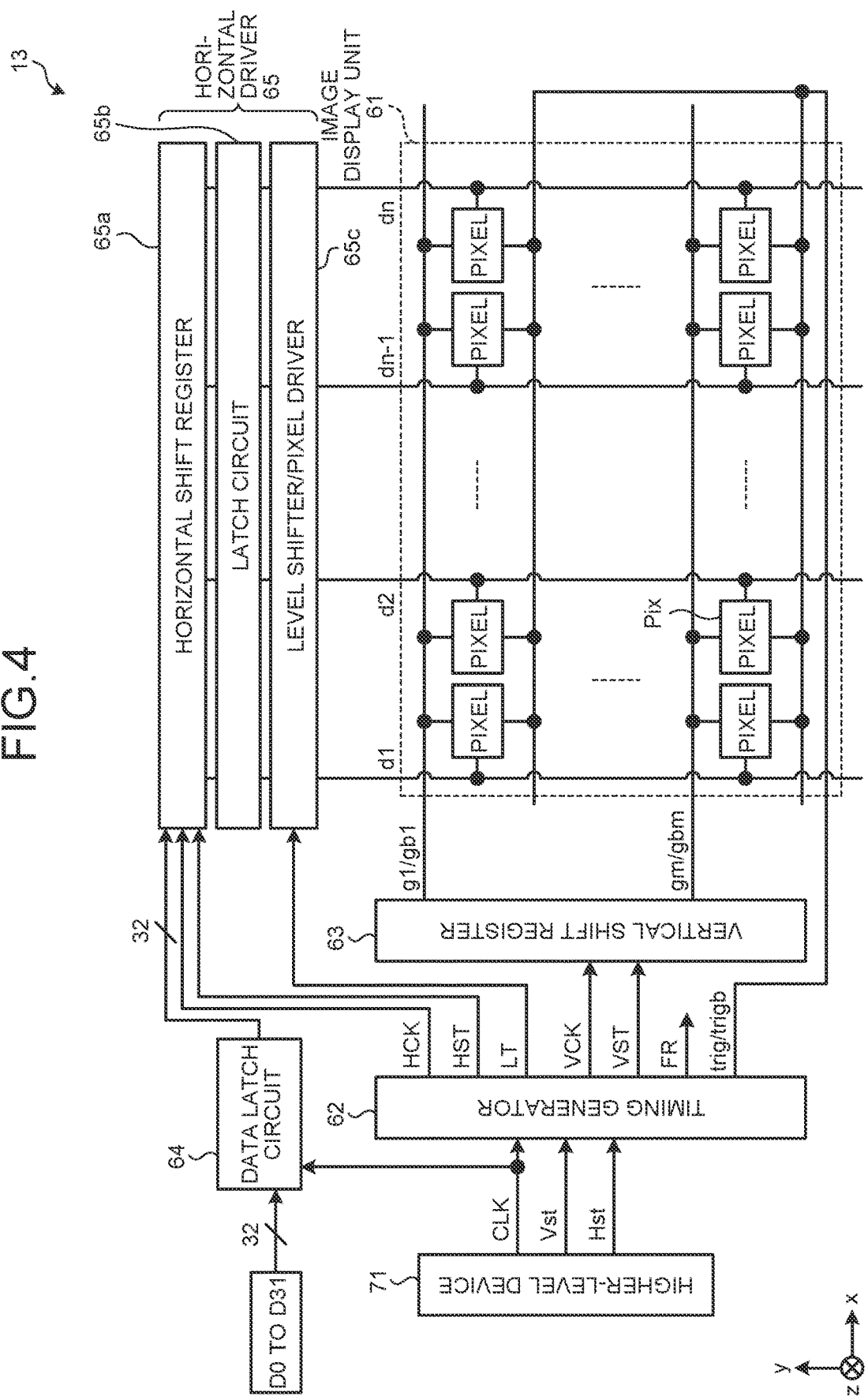
FIG. 4 is a diagram illustrating a configuration of a reflective liquid crystal display device of a second embodiment.

FIG. 4 is a diagram illustrating a configuration of a reflective liquid crystal display device of a second embodiment.

A reflective liquid crystal display device 13 uses a subframe driving method as a halftone display method. In a subframe driving method which is one type of a time base modulation method, a predetermined time period (for example, in a case of moving images, one frame period as a display unit for one image) is divided into multiple subframe periods and pixels are driven according to a combination of the subframes corresponding to gradation to be displayed. The gradation to be displayed is determined by a ratio of the pixel driving period to the predetermined time period, and this ratio is determined by the combination of the subframes.

The reflective liquid crystal display device 13 includes an image display unit 61 in which multiple pixels Pix are regularly arranged, a timing generator 62, a vertical shift register 63, a data latch circuit 64, and a horizontal driver 65. The horizontal driver 65 includes a horizontal shift register 65$a$, a latch circuit 65$b$, and a level shifter/pixel driver 65$c$.

The timing generator 62, the vertical shift register 63, the data latch circuit 64, and the horizontal driver 65 correspond to an example of a "spatial light modulator drive unit" of the present application.

A row scan line g1 to a row scan line gm of m row scan lines (where m is a natural number of 2 or larger) extend in a row direction (x direction) and one end of each of the m row scan lines is connected to the vertical shift register 63. In addition to the row scan lines g1 to gm, inverted row scan lines gb1 to gbm may be provided. Column data lines d1 to dn of n column data lines (where n is a natural number of 2 or larger) extend in a column direction (y direction) and one end of each of the n column data lines is connected to the level shifter/pixel driver 65$c$. In addition to the column data lines d1 to dn, inverted column data lines db1 to dbn may be provided.

The image display unit 61 has the multiple pixels Pix provided at intersections where the row scan lines g1 to gm and the column data lines d1 to dn intersect with each other. That is, the multiple pixels Pix are arranged in a two-dimensional matrix.

All of the pixels Pix in the image display unit 61 are commonly connected to a trigger line trig having one end connected to the timing generator 62. In addition to the trigger line trig, an inversion trigger line trigb may be included.

A normal (non-inverted) row scan pulse transmitted by the row scan lines g1 to gm and an inverted row scan pulse transmitted by the inverted row scan lines gb1 to gbm are always in a logically inverted relation (complementary relation).

Furthermore, normal (non-inverted) data transmitted by the column data lines d1 to do and inverted data transmitted by the inverted column data lines db1 to dbn are always in a logically inverted relation (complementary relation).

Furthermore, a normal trigger pulse TRIG transmitted by the trigger line trg and an inverted trigger pulse TRIGB transmitted by the inversion trigger line trigb are always in a logically inverted relation (complementary relation).

The timing generator 62 receives, from a higher-level device 71, external signals such as a vertical synchronization signal Vst, a horizontal synchronization signal Hst, and a basic clock signal CLK as input signals. The timing generator 62 generates, based on the external signals, internal signals such as an alternating current signal FR, a vertical start pulse VST, a horizontal start pulse HST, clock signals VCK and HCK, a latch pulse LT, a normal trigger pulse TRIG, and an inverted trigger pulse TRIGB.

The alternating current signal FR is a signal a polarity of which is inverted every subframe and is supplied, as a common electrode voltage Vcom described later, to a common electrode of liquid crystal elements in the pixels Pix which constitutes the image display unit 61. The vertical start pulse VST is a pulse signal output at a start of each subframe described later and this vertical start pulse VST controls switching between the subframes. The horizontal start pulse HST is a pulse signal output at the start and input to the horizontal shift register 65a. The clock signal VCK is a shift clock that prescribes one horizontal scan period (1H) in the vertical shift register 63 and the vertical shift register 63 performs shift operation at a timing of the clock signal VCK. The clock signal HCK is a shift clock at the horizontal shift register 65a and is a signal for shifting data at a width of 32 bits.

The latch pulse LT is a pulse signal output when the horizontal shift register 65a finishes shifting data for the pixels of one row in a horizontal direction. The timing generator 62 supplies the normal trigger pulse TRIG through the trigger line trig and the inverted trigger pulse TRIGB through the inversion trigger line trigb, to all of the pixels Pix in the image display unit 61. The normal trigger pulse TRIG and the inverted trigger pulse TRIGB are output immediately after data are sequentially written into a first signal holding circuit (described later) in each of the pixels Pix in the image display unit 61 in a subframe period. The normal trigger pulse TRIG and the inverted trigger pulse TRIGB are signals for transferring the data in the first signal holding circuits (described later) of all of the pixels Pix in the image display unit 61 to second signal holding circuits (described later) in the same pixels Pix at once in the subframe period in which the normal trigger pulse TRIG and the inverted trigger pulse TRIGB have been output.

The vertical shift register 63 transfers the vertical start pulse VST supplied at a beginning of each of the subframes, according to the clock signal VCK. Furthermore, the vertical shift register 63 sequentially supplies the normal row scan pulse to the row scan lines g1 to gm and the inverted row scan pulse to the inverted row scan lines gb1 to gbm, by the 1H exclusively. The vertical shift register 63 supplies the normal row scan pulse to all of the row scan lines g1 to gm and the inverted row scan pulse to all of the inverted row scan lines gb1 to gbm, in one frame period. The row scan lines g from the uppermost row scan line g1 to the lowermost row scan line gm and inverted row scan lines gb from the uppermost inverted row scan line gb1 to the lowermost inverted row scan line gbm are thereby sequentially selected one by one respectively by the 1H in one frame period.

The data latch circuit 64 latches, based on the basic clock signal CLK from the higher-level device 71, data of a 32-bit (D0-D31) width which is divided every subframes and supplied from an external circuit not illustrated in the drawings. Thereafter, the data latch circuit 64 outputs, in synchronization with the basic clock signal CLK, the latched data to the horizontal shift register 65a. The reflective liquid crystal display device 13 in this second embodiment divides one frame of a video signal into multiple subframes each of which has a display period shorter than one frame period of the video signal, and performs a gradation display according to a combination of the subframes. Therefore, the above mentioned external circuit converts gradation data representing gradation of each of the pixels in the video signal into subframe data of one bit by the subframe for displaying the gradation of each of the pixels by all of the subframes. The external circuit then also collectively supplies, as the data of the 32-bit width, the subframe data for the 32 pixels in the same subframe, to the data latch circuit 64.

The horizontal shift register 65a in a processing system for one-bit serial data starts shifting of the data according to the horizontal start pulse HST supplied at the beginning of the 1H from the timing generator 62. The horizontal shift register 65a shifts the data of the 32-bit width supplied from the data latch circuit 64, in synchronization with the clock signal HCK. The latch pulse LT is supplied from the timing generator 62 at a time point when the horizontal shift register 65a finishes shifting of the data of n-bit, n being the same as the number of pixels n in one row in the image display unit 61. The latch circuit 65b latches data (that is, subframe data of n pixels in the same row) of n-bit supplied from the horizontal shift register 65a in parallel according to the latch pulse LT and outputs the data to a level shifter in the level shifter/pixel driver 65c. When the transfer of the data to the latch circuit 65b is ended, the horizontal start pulse HST is output from the timing generator 62 again and the horizontal shift register 65a restarts the shifting of the data of 32-bit width from the data latch circuit 64 according to the clock signal HCK.

The level shifter in the level shifter/pixel driver 65c perform level-shift of a signal level of n sets of the subframe data corresponding to the n pixels of one row latched by and supplied from the latch circuit 65b, to a liquid crystal drive voltage amplitude. A pixel driver in the level shifter/pixel driver 65c outputs the n sets of the subframe data corresponding to the n pixels of one row that have been level-shifted, to the n column data lines d1 to dn in parallel.

The horizontal driver 65 performs output of the data to a pixel row into which data are to be written this time in the 1H, and shift of the data for a pixel row into which data are to be written in the next 1H, in parallel. In a horizontal scan period, n sets of the latched subframe data for one row are respectively output in parallel and at once as data signals to the n column data lines d1 to dn.

The n pixels Pix of one row selected by the normal row scan pulse from the vertical shift register 63 sample, via the n column data lines d1 to dn, the n sets of the subframe data for one row output at once from the level shifter/pixel driver 65c. The n pixels Pix for one row then respectively write the sampled n sets of subframe data for the one row into first signal holding circuits (described later) in the pixels Pix.

Figure 5:
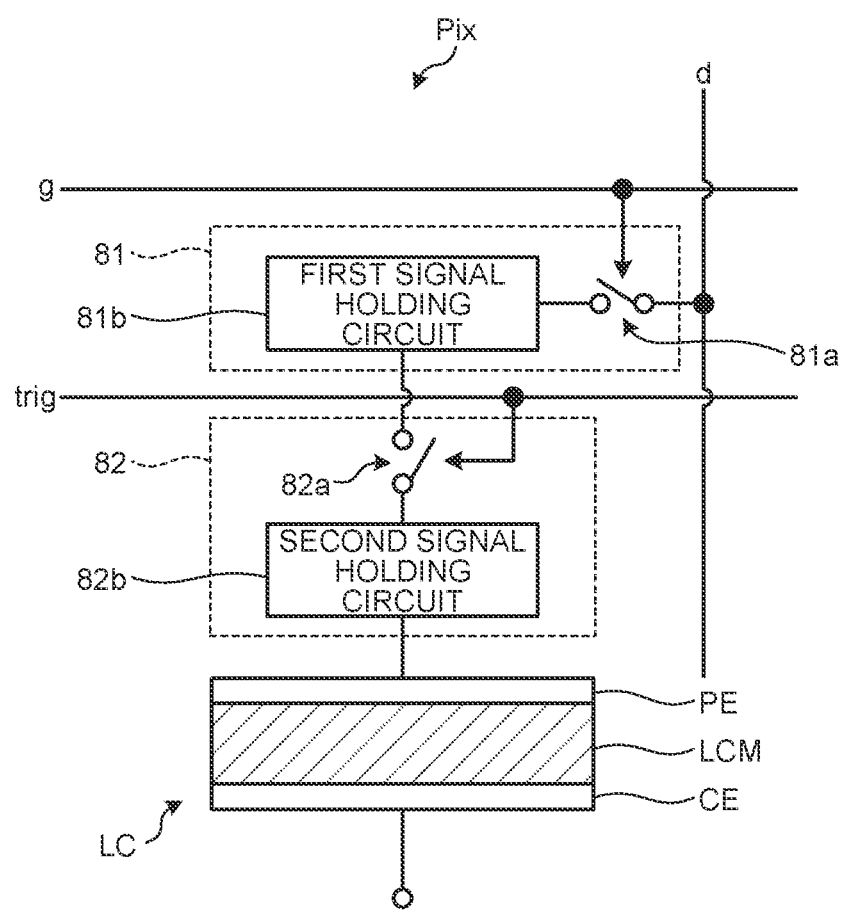
FIG. 5 is a diagram illustrating a configuration of a pixel of the reflective liquid crystal display device of the second embodiment.

FIG. 5 is a diagram illustrating a configuration of a pixel of the reflective liquid crystal display device of the second embodiment.

A pixel Pix is arranged at an intersection between a row scan line g and a column data line d. The pixel Pix includes a first memory 81 and a second memory 82 that store gradation data (pixel data) of one bit respectively. The first memory 81 includes a switch 81a and a first signal holding circuit 81b. The second memory 82 includes a switch 82a and a second signal holding circuit 82b.

The pixel Pix includes a liquid crystal display element LC. The liquid crystal display element LC has a liquid crystal LCM held between a reflective electrode PE and a common electrode CE that are arranged opposite to each other. The common electrode CE is formed on an opposing substrate of the reflective liquid crystal display device 13, for example, but the present application is not limited to this example.

The column data line d is connected to the horizontal driver 65 (see FIG. 4). The horizontal driver 65 drives a specific column data line d by changing the drive timing. The row scan line g is connected to the vertical shift register 63 (see FIG. 4). The vertical shift register 63 drives a specific row scan line g by changing the drive timing.

The switch 81a is turned on when a normal row scan pulse is supplied to the row scan line g. Gradation data supplied from the column data line d are then written into the first signal holding circuit 81b via the switch 81a. The switch 82a is turned on when a normal trigger pulse TRIG is supplied to the trigger line trig. The gradation data that have been held by the first signal holding circuit 81b are then transferred to the second signal holding circuit 82b via the switch 82a. The gradation data that have been transferred to the second signal holding circuit 82b are supplied to the reflective electrode PE of the liquid crystal display element LC.

When one pixel Pix at a specific intersection is selected by the column data line d and the row scan line g, the gradation data of one bit are written into the first memory 81 in the one pixel Pix. By repeating this with the timing shifted for all of the pixels Pix, the gradation data of one bit are written into all of the pixels Pix. Thereafter, by supply of the normal trigger pulse TRIG to the trigger line trig commonly connected to all of the pixels Pix, the gradation data held in the first memories 81 in all of the pixels Pix are transferred to the second memories 82. The reflective electrodes PE are connected to the second memories 82 and the gradation data held in the second memories 82 are thus applied to the liquid crystal display elements LC.

The first memories 81 and the second memories 82 are no longer electrically connected to each other by ending of the supply of the normal trigger pulse TRIG when the transfer of the gradation data from the first memories 81 to the second memories 82 is ended. Then the gradation data of one bit are written into the first memories 81 of all of the pixels Pix again. While the gradation data are being written into the first memories 81, the gradation data held in the second memories 82 continue to be applied to the liquid crystal display elements LC.

The gradation data is explained in the following description. Firstly, the normal gradation data in the subframe are written into all of the pixels Pix, and the liquid crystal display elements LC perform display based on the normal gradation data in the subframe. Subsequently, the inverted gradation data in the subframe are written into the first memories 81 of all of the pixels Pix. The normal trigger pulse TRIG is supplied when the writing of the inverted gradation data in the subframe into the first memories 81 is ended and the inverted gradation data in the subframe are transferred to the second memories 82 in all of the pixels Pix at once. The liquid crystal display elements LC then perform display based on the inverted gradation data in the subframe. At that time, the common electrode voltage Vcom supplied to the common electrode CE of the liquid crystal display elements LC is inverted. A voltage relation between the inverted gradation data in the subframe and the common electrode voltage Vcom is inverse of a case in which the normal gradation data in the subframe are applied to the liquid crystal display elements LC. That is, sequentially inputting the normal gradation data in the subframe and the inverted gradation data in the subframe into the pixels Pix enables the liquid crystal display elements LC to implement an alternating current driving of positive and negative waveforms. The reflective liquid crystal display device 13 that is highly reliable is thereby able to be implemented without burning in the liquid crystal display elements LC.

This configuration of the pixels Pix enables separation between a writing period of the gradation data into the first memories 81 of the pixels Pix and a applying period of the gradation data to the reflective electrodes PE of the liquid crystal display elements LC. That is, the gradation data written into the first memories 81 in the writing period of the gradation data are not applied to the liquid crystal display elements LC at the time when the gradation data are written into the first memories 81. Therefore, the voltage relation between the voltage at the reflective electrodes PE and the common electrode voltage Vcom will not be changed during the writing of the gradation data into the first memories 81. Therefore, the liquid crystal display elements LC do not need to be turned off with the reflective electrodes PE and the common electrode CE being set at the same potential during the writing period of the gradation data as done conventionally. Accordingly, a loss time for displaying the liquid crystal display elements LC in the writing period of the gradation data is able to be eliminated, and the reflective liquid crystal display device 13 with excellent gradation and high performance is thus able to be provided. Furthermore, a restriction that the liquid crystal display elements LC are unable to perform display during the writing period of the gradation data will be eliminated. Therefore, the reflective liquid crystal display device 13 that is high in performance is able to be implemented without sacrificing gradation, even for a display with a large number of pixels, such as that of FHD (1920×1080) or 4K2K.

Third Embodiment

Figure 6:
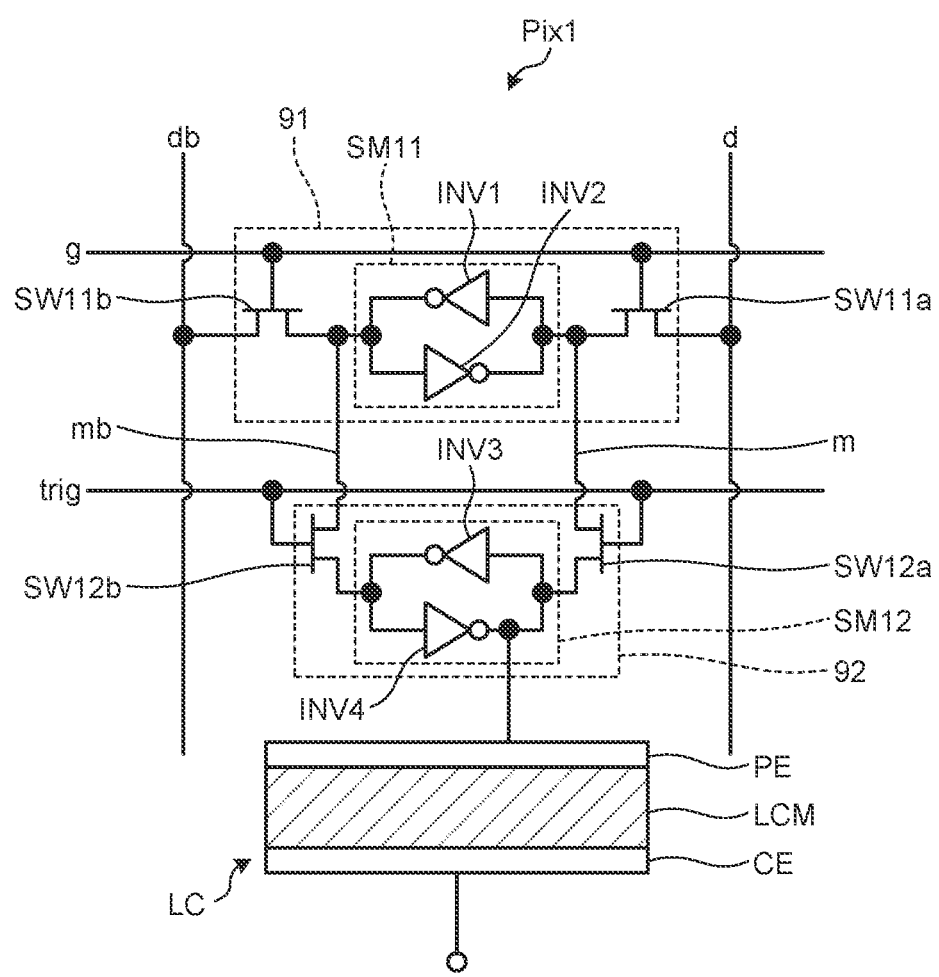
FIG. 6 is a diagram illustrating a circuit configuration of a pixel of a reflective liquid crystal display device of a third embodiment.

FIG. 6 is a diagram illustrating a circuit configuration of a pixel of a reflective liquid crystal display device of a third embodiment.

Each of a column data line d and an inverted column data line db has one end connected to the level shifter/pixel driver 65c (see FIG. 4) and extends in a column direction (y direction). The column data line d and the inverted column data line db are any pair of n pairs of the column data lines dj for the normal gradation data in the subframe and the inverted column data lines dbj for the inverted gradation data in the subframe in total, each of the n pairs having a column data line dj for normal subframe gradation data and an inverted column data line dbj for inverted gradation data. A pixel Pix1 is provided at an intersection between any pair of the column data line d and the inverted column data line db and any single row scan line g.

The pixel Pix1 includes a first memory 91, a second memory 92, and a liquid crystal display element LC. The first memory 91 includes switches SW11a and SW11b and a first signal holding circuit SM11. The second memory 92 includes switches SW12a and SW12b and a second signal holding circuit SM12.

In the pixel Pix1, each of the first memory 91 and each of the second memory 92 consist of a static random access memory (SRAM).

The switches SW11a and SW11b correspond to an example of a "first switching circuit" of the present application. The first signal holding circuit SM11 corresponds to an example of a "first signal holding circuit" of the present application. The first memory 91 corresponds to an example of a "first static random access memory" of the present application. The switches SW12a and SW12b correspond to an example of a "second switching circuit" of the present application. The second signal holding circuit SM12 corresponds to an example of a "second signal holding circuit" of the present application. The second memory 92 corresponds to an example of a "second static random access memory" of the present application.

The switch SW11a is composed of an N-channel metal oxide semiconductor (MOS) (hereinafter, NMOS) transistor having a gate connected to the row scan line g, a drain connected to the column data line d, and a source connected to one of input terminals of the first signal holding circuit SM11. The switch SW11b is composed of an NMOS transistor having a gate connected to the row scan line g, a drain connected to the inverted column data line db, and a source connected to the other of the input terminals of the first signal holding circuit SM11.

The first signal holding circuit SM11 is a self-holding memory composed of two inverters INV1 and INV2, an output terminal of one of the inverters INV1 and INV2 being connected to an input terminal of the other of the inverters INV1 and INV2. The input terminal of the inverter INV1 is connected to the output terminal of the inverter INV2, a source of the NMOS transistor which constitutes the switch SW11a, and the switch SW12a. The input terminal of the inverter INV2 is connected to the output terminal of the inverter INV1, the source of the NMOS transistor which constitutes the switch SW11b, and the switch SW12b.

The switch SW12a is composed of an NMOS transistor having a gate connected to a trigger line trig, a drain connected to a connection point between the first signal holding circuit SM11 and the switch SW11a, and a source connected to one of input terminals of the second signal holding circuit SM12. The switch SW12b is composed of an NMOS transistor having a gate connected to the trigger line trig, a drain connected to a connection point between the first signal holding circuit SM11 and the switch SW11b, and a source connected to the other of the input terminals of the second signal holding circuit SM12.

The second signal holding circuit SM12 is a self-holding memory composed of two inverters INV3 and INV4, an output terminal of one of the inverters INV3 and INV4 being connected to an input terminal of the other of the inverters INV3 and INV4. The input terminal of the inverter INV3 is connected to the output terminal of the inverter INV4, a source of the NMOS transistor which constitutes the switch SW12a, and a reflective electrode PE. The input terminal of the inverter INV4 is connected to the output terminal of the inverter INV3 and a source of the NMOS transistor which constitutes the switch SW12b.

Each of the inverters INV1, INV2, INV3, and INV4 is composed of, for example, a complementary metal oxide semiconductor (CMOS) inverter.

Figure 7:
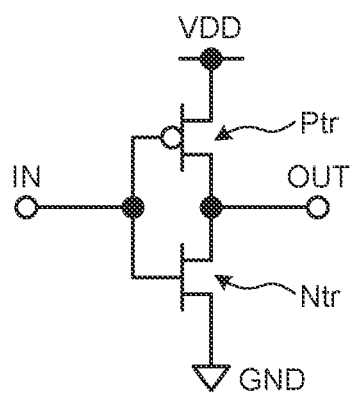
FIG. 7 is a diagram illustrating a circuit configuration of a CMOS inverter.

FIG. 7 is a diagram illustrating a circuit configuration of the CMOS inverter. A source of a PMOS transistor Ptr is connected to a power source voltage VDD. A drain of the PMOS transistor Ptr is connected to a drain of an NMOS transistor Ntr. A source of the NMOS transistor Ntr is connected to a reference voltage GND. A gate of the PMOS transistor Ptr and a gate of the NMOS transistor Ntr are connected to each other, and serve as an input terminal IN of the CMOS inverter. The drain of the PMOS transistor Ptr and the drain of the NMOS transistor Ntr are connected to each other and serve as an output terminal OUT of the CMOS inverter.

With reference to FIG. 6 again, gradation data are written into the first memory 91 via the two switches SW11a and SW11b operated by a normal row scan pulse. Sets of gradation data having polarities opposite to each other are supplied to the column data line d and inverted column data line db. Each of the two switches SW11a and SW11b is composed of the NMOS transistor. The power source voltage VDD is supplied to the drain of the NMOS transistor of one of the switches SW11a and SW11b and the reference voltage GND is supplied to the drain of the NMOS transistor of the other of the switches SW11a and SW11b. When the power source voltage VDD is supplied to the drain of the NMOS transistor of the one, only a voltage lower than the power source voltage VDD by a threshold voltage Vth of the NMOS transistor is output from the source of that NMOS transistor. Moreover, with that voltage, the NMOS transistor will be driven at a voltage around the threshold voltage Vth and almost no electric current will thus flow therethrough. Therefore, gradation data are written into the first memory 91 by the other NMOS transistor, to which the reference voltage GND is supplied.

Gradation data are written into the second memory 92 via the two switches SW12a and SW12b operated by a normal trigger pulse TRIG. Sets of gradation data having polarities opposite to each other are supplied to a wiring m between the output terminal of the inverter INV2 and the switch SW12a and a wiring mb between the output terminal of the inverter INV1 and the switch SW12b. Each of the two switches SW12a and SW12b includes the NMOS transistor. The power source voltage VDD is supplied to the drain of the NMOS transistor of one of the switches SW12a and SW12b and the reference voltage GND is supplied to the drain of the NMOS transistor of the other of the switches SW12a and SW12b. When the power source voltage VDD is supplied to the drain of the NMOS transistor of the one, only a voltage lower than the power source voltage VDD by a threshold voltage Vth of the NMOS transistor is output from the source of that NMOS transistor. Moreover, with that voltage, the NMOS transistor will be driven at a voltage around the threshold voltage Vth and almost no electric current will thus flow therethrough. Therefore, gradation data are written into the second memory 92 by the other NMOS transistor, to which the reference voltage GND is supplied.

When a normal trigger pulse TRIG is supplied, gradation data in the second memory 92 need to be rewritten by gradation data in the first memory 91. That is, the gradation data in the first memory 91 must not be rewritten by the gradation data in the second memory 92. Therefore, a driving force of the inverters INV3 and INV4 which constitute the second memory 92 needs to be smaller than a driving force of the inverters INV1 and INV2 which constitute the first memory 91. That is, when the gradation data in the first memory 91 differs from that in the second memory 92, the output from the inverter INV1 and the output from the inverter INV3 will compete against each other upon supply of a normal trigger pulse TRIG. To enable the gradation data in the inverter INV4 to be infallibly rewritten by the gradation data in the inverter INV1, the driving force of the inverter INV1 needs to be larger than the driving force of the inverter INV3.

Similarly, in competition between the inverter INV2 and the inverter INV4, gradation data in the inverter INV3 need to be infallibly rewritten by gradation data in the inverter INV2. Therefore, the driving force of the inverter INV2 needs to be larger than the driving force of the inverter INV4.

Figure 8:
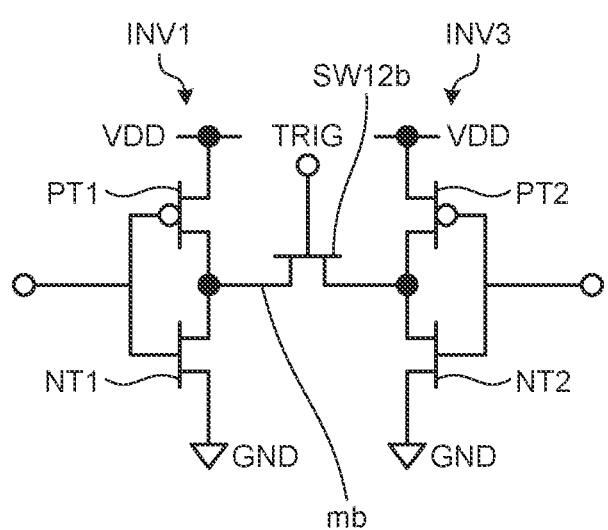
FIG. 8 is a diagram for explanation of a relation of the driving force magnitude between the inverters.

FIG. 8 is a diagram for explanation of a relation of the driving force magnitude between the inverters.

A relation between the inverter INV1 and the inverter INV3 is now simply explained. When the gradation data in the first memory 91 on the wiring mb is at an "H" level, the PMOS transistor PT1 of the inverter INV1 has been turned on. By contrast, when the gradation data in the second memory 92 on the wiring mb is at an "L" level, the NMOS transistor NT2 of the inverter INV3 has been turned on.

A case in which the output of the inverter INV1 and the output of the inverter INV3 are electrically connected to each other when the NMOS transistor which constitutes the switch SW12b turns on by the "H" level of the normal trigger pulse TRIG is now discussed. Electric current flows from the power source voltage VDD to the reference voltage GND via the PMOS transistor PT1 of the inverter INV1 and the NMOS transistor NT2 of the inverter INV3. In this flow, voltage in the wiring mb is determined by a ratio between on-resistances of the PMOS transistor PT1 of the inverter INV1 and the NMOS transistor NT2 of the inverter INV3.

On the contrary, when the gradation data in the first memory 91 on the wiring mb is at the "L" level, the NMOS transistor NT1 of the inverter INV1 has been turned on. By contrast, when the gradation data in the second memory 92 on the wiring mb is at the "H" level, the PMOS transistor PT2 of the inverter INV3 has been turned on.

A case in which the output of the inverter INV1 and the output of the inverter INV3 are electrically connected to each other when the NMOS transistor which constitutes the switch SW12b turns on by the "H" level of the normal trigger pulse TRIG is now discussed. Electric current flows from the power source voltage VDD to the reference voltage GND via the PMOS transistor PT2 of the inverter INV3 and the NMOS transistor NT1 of the inverter INV1. In this flow, voltage in the wiring mb is determined by a ratio between on-resistances in the PMOS transistor PT2 of the inverter INV3 and the NMOS transistor NT1 of the inverter INV1.

Furthermore, the input terminal of the inverter INV4 (see FIG. 6) is connected to the wiring mb. Output data from the inverter INV4 is set at the "L" level or "H" level by input of a voltage level in the wiring mb. That is, output data from the second memory 92 is determined by the voltage level in the wiring mb. Therefore, rewriting the gradation data in the second memory 92 with the gradation data in the first memory 91 requires the on-resistances of the transistors in the inverters INV1 and INV2 to be lower than the on-resistances of the transistors in the inverters INV3 and INV4. Since the on-resistances of the transistors in the inverters INV1 and INV2 are lower than the on-resistances of the transistors in the inverters INV3 and INV4, the gradation data in the first memory are infallibly written into the second memory 92 regardless of the gradation data level in the second memory 92.

Use of a transistor the on-resistance of which is low ca be achieved by use of a transistor the driving force of which is high, and this can be achieved by decrease in a gate length or increase in a gate width.

With reference to FIG. 6 again, when sets of the gradation data stored in the first memories 91 are transferred at once to the second memories 92 in all of the pixels Pix1, the normal trigger pulse TRIG becomes the "L" level and the switches SW12a and SW12b are turned off. Therefore, the second memory 92 can hold the transferred gradation data and fix a potential of the reflective electrode PE at a potential according to the gradation data for any period (a period for one subframe herein).

Each of the switches SW11a, SW11b, SW12a, and SW12b may be composed of a PMOS transistor. In this case, the polarity opposite to that in the description above is applicable and illustration and description thereof will thus be omitted.

Furthermore, each of the switches SW11a, SW11b, SW12a, and SW12b may be a transmission gate composed of a PMOS transistor and an NMOS transistor.

Figure 9:
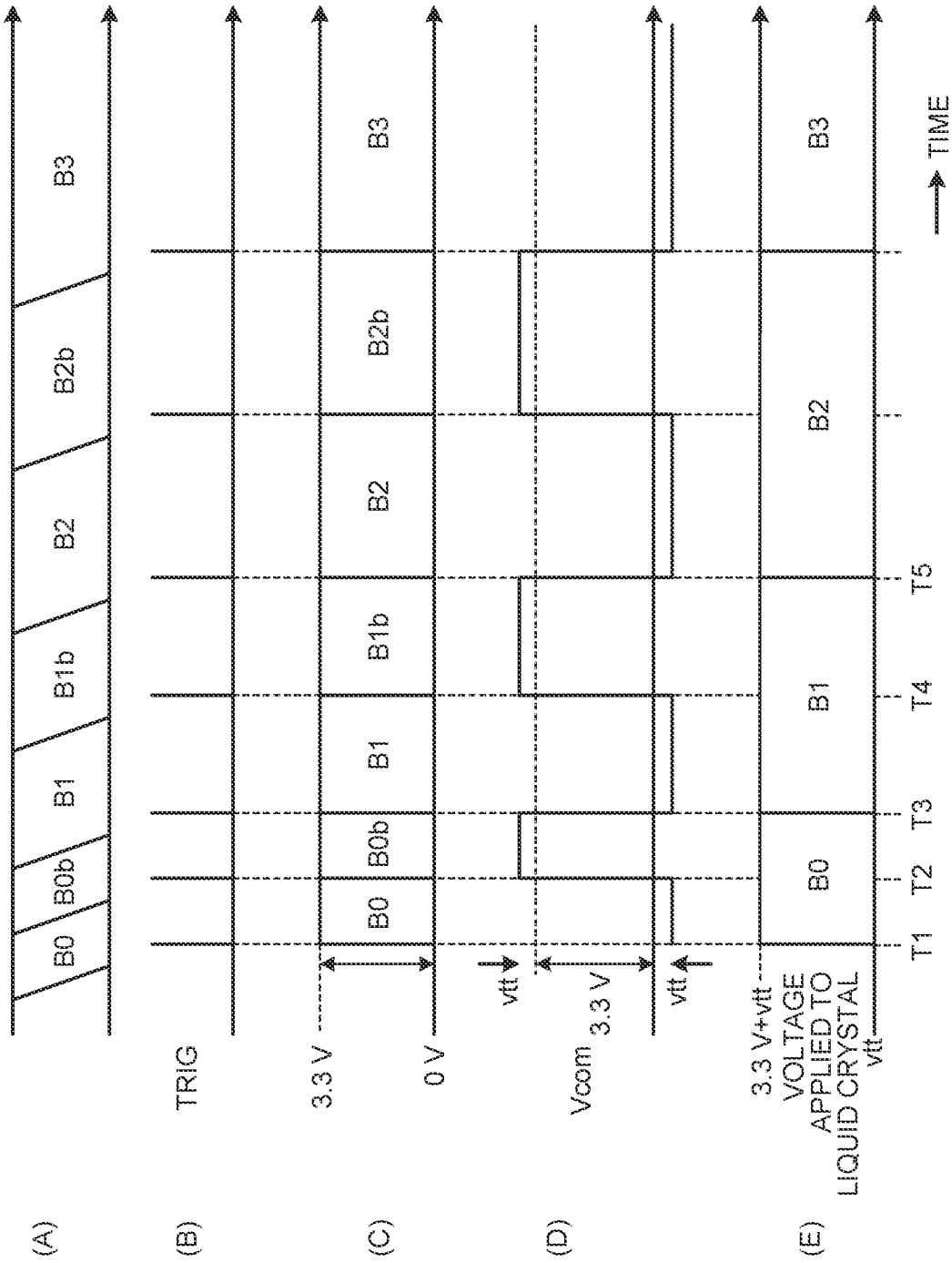
FIG. 9 is a timing chart illustrating operation of the reflective liquid crystal display device of the third embodiment.

FIG. 9 is a timing chart illustrating operation of the reflective liquid crystal display device of the third embodiment.

As described already, in the reflective liquid crystal display device 13 (see FIG. 4), according to the normal row scan pulse output from the vertical shift register 63, the row scan lines g are sequentially selected one by one in 1H units from the row scan line g1 to the row scan line gm. Gradation data are written into multiple pixels Pix1 which constitute the image display unit 61 for n pixels Pix1 of one row commonly connected to the selected row scan line g. After writing into all of the pixels Pix1 which constitute the image display unit 61 is ended, transfer from the first memories 91 to the second memories 92 in all of the pixels Pix1 is performed at once according to the normal trigger pulse TRIG.

FIG. 9(A) schematically illustrates a writing period and a reading period for one pixel of subframe gradation data of one bit output to the column data lines d1 to do from the horizontal driver 65. Falling diagonal lines from left to right represent the writing periods. In FIG. 9(A), bits B0b, B1b, and B2b are inverted data of gradation data of bits B0, B1, and B2.

FIG. 9(B) illustrates the normal trigger pulses TRIG output to the trigger line trig from the timing generator 62. The normal trigger pulses TRIG are output every one subframes.

FIG. 9(C) schematically illustrates bits of the gradation data in the subframes applied to the reflective electrode PE. FIG. 9(D) illustrates the common electrode voltage Vcom. FIG. 9(E) illustrates voltage applied to the liquid crystal LCM.

Firstly, the switches SW11a and SW11b in the pixels Pix1 of one row selected by the normal row scan pulse output from the timing generator 62 are turned on by the normal row scan pulse. The normal Gradation data in the subframe of the bit B0 (FIG. 9(A)) output to the column data line d are then sampled by the switches SW11a and written into the first signal holding circuits SM11. Similarly, the normal gradation data in the subframe of the bit B0 are written into the first signal holding circuits SM11 of all of the pixels Pix1 which constitute the image display unit 61. At a time T1 after the writing operation is ended, a normal trigger pulse TRIG (FIG. 9(B)) at the "H" level is concurrently supplied to all of the pixels Pix1 which constitute the image display unit 61.

The switches SW12a and SW12b in all of the pixels Pix1 are thereby turned on. Therefore, the normal gradation data in the subframe of the bit B0 stored in the first signal holding circuits SM11 is transferred to the second signal holding circuits SM12 at once via the switches SW12a and SW12b, and is held by the second signal holding circuits SM12. The normal gradation data in the subframe of the bit B0 is also applied to the reflective electrodes PE. A period for which the normal gradation data in the subframe of the bit B0 is held by the second signal holding circuits SM12 is a period for one subframe from the time T1 to a time T2 at which the next normal trigger pulse TRIG at the "H" level is input.

When the gradation data in the subframe has a bit value of "1", that is, the "H" level, the power source voltage VDD (for example, 3.3 V) is applied to the reflective electrodes PE. When the gradation data in the subframe has a bit value of "0", that is, the "L" level, the reference voltage GND (for example, 0 V) is applied to the reflective electrodes PE. By contrast, without being limited to the reference voltage GND or the power source voltage VDD, free voltage is able to be applied to the common electrode CE as the common electrode voltage Vcom. The common electrode voltage Vcom is configured to be switched to a prescribed voltage at the same timing of the supply of the normal trigger pulse TRIG at the "H" level. During a period of the subframe (for example, from the time T1 to the time T2) in which the normal gradation data in the subframe is applied to the reflective electrodes PE, the common electrode voltage Vcom is set, as illustrated in FIG. 9(D), to a voltage lower than 0 V by a threshold voltage Vtt of the liquid crystal LCM.

The liquid crystal display elements LC perform gradation display according to a voltage applied to the liquid crystal LCM which is an absolute value of a difference voltage between a voltage applied to the reflective electrodes PE and the common electrode voltage Vcom. In a period of one subframe from the time T1 to the time T2, the normal gradation data in the subframe of the bit B0 is applied to the reflective electrodes PE. Therefore, as illustrated in FIG. 9(E), the voltage applied to the liquid crystal LCM becomes 3.3 V+Vtt (=3.3 V−(−Vtt)) when the bit value of the gradation data in the subframe is "1". By contrast, when the bit value of the gradation data in the subframe is "0", the voltage applied to the liquid crystal LCM becomes +Vtt (=0 V−(−Vtt)).

Figure 10:
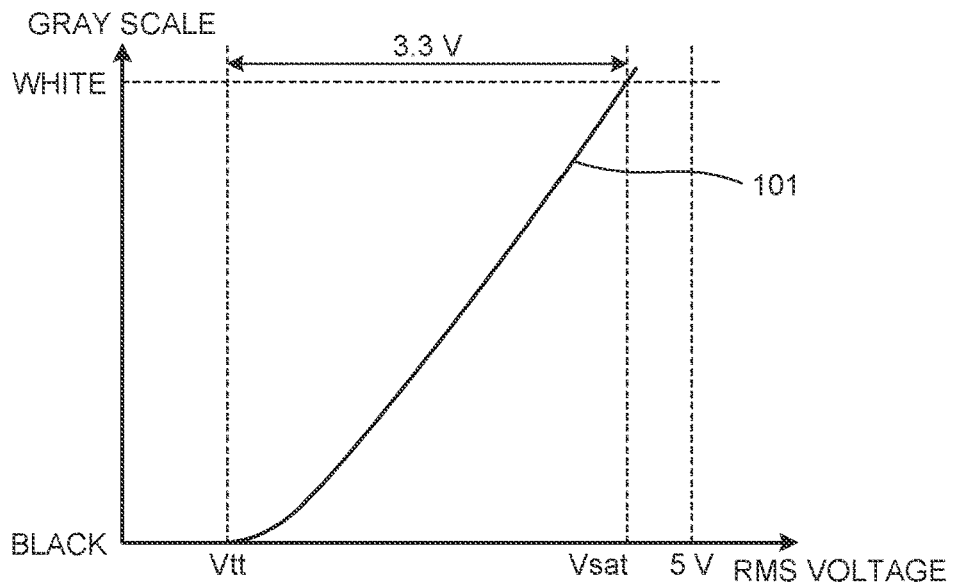
FIG. 10 is a diagram illustrating a relation between voltage applied to a liquid crystal and a gray scale value.

FIG. 10 is a diagram illustrating a relation between a voltage applied to a liquid crystal (RMS (effective) voltage) and a gray scale value.

As illustrated in FIG. 10, a gray scale value curve 101 is shifted toward the high voltage. Specifically, the gray scale value of black corresponds to the RMS voltage of the threshold voltage Vtt of the liquid crystal LCM, and the gray scale value of white corresponds to the RMS voltage of a saturated voltage Vsat (=3.3 V+Vtt) of the liquid crystal LCM. A gray scale value is able to be conformed to an effective portion of the gray scale value curve 101. Therefore, as described above, when the voltage applied to the liquid crystal LCM is (3.3 V+Vtt), the liquid crystal display elements LC display white and when that voltage is +Vtt, the liquid crystal display elements LC display black.

With reference to FIG. 9 again, in the subframe period in which the normal gradation data in the subframe of the bit B0 is displayed, writing of the inverted gradation data in the subframe of the bit B0b (see FIG. 9(A)) into the first signal holding circuits SM11 of the pixels Pix1 is sequentially started. The inverted gradation data in the subframe of the bit B0b is written into the first signal holding circuits SM11 of all of the pixels Pix1 in the image display unit 61. At the time T2 after that writing is ended, the normal trigger pulse TRIG at the "H" level is supplied concurrently to all of the pixels Pix1 which constitute the image display unit 61.

The switches SW12a and SW12b in all of the pixels Pix1 are thereby turned on. Therefore, the inverted gradation data in the subframe of the bit B0b stored in the first signal holding circuits SM11 is transferred to the second signal holding circuits SM12 via the switches SW12a and SW21b, and is held by the second signal holding circuits SM12. The inverted gradation data in the subframe of the bit B0b is also applied to the reflective electrodes PE. A period for which the inverted gradation data in the subframe of the bit B0b is held by the second signal holding circuits SM12 is a period for one subframe from the time T2 to a time T3 at which the next normal trigger pulse TRIG at the "H" level is supplied. The inverted gradation data in the subframe of the bit B0b and the normal gradation data in the subframe of the bit B0 are always in a logically inverted relation. Therefore, the inverted gradation data in the subframe of the bit B0b is "0" when the normal gradation data in the subframe of the bit B0 are "1", and the inverted gradation data in the subframe of the bit B0b is "1" when the normal gradation data in the subframe of the bit B0 are "0".

By contrast, the common electrode voltage Vcom is set to a voltage higher than 3.3 V by the threshold voltage Vtt of the liquid crystal LCM as illustrated in FIG. 9(D), during a period of one subframe from the time T2 to the time T3 in which the inverted gradation data in the subframe is applied to the reflective electrodes PE. Therefore, in the period for one subframe from the time T2 to the time T3, the voltage applied to the liquid crystal LCM becomes, as illustrated in FIG. 9(E), −Vtt (=3.3 V−(3.3 V+Vtt)) when the bit value of the gradation data in the subframe is "1". By contrast, when the bit value of the gradation data in the subframe is "0", the voltage applied to the liquid crystal LCM becomes −3.3 V −Vtt (=0 V −(3.3 V+Vtt)).

When the bit value of the normal gradation data in the subframe of the bit B0 is "1", the bit value of the inverted gradation data in the subframe of the bit B0b input subsequently is "0". Therefore, the voltage applied to the liquid crystal LCM becomes −(3.3 V+Vtt), the polarity thereof is opposite to and the absolute value thereof is the same as that in the normal gradation data in the subframe of the bit B0. Therefore, similarly to the display of the normal gradation data in the subframe of the bit B0, the pixels Pix1 display white. Similarly, when the bit value of the normal gradation data in the subframe of the bit B0 is "0", the bit value of the inverted gradation data in the subframe of the bit B0b input subsequently is "1". Therefore, the voltage applied to the liquid crystal LCM becomes −Vtt, the polarity thereof is opposite to and the absolute value thereof is the same as that in the normal gradation data in the subframe of the bit B0. Therefore, similarly to the display of the normal gradation data in the subframe of the bit B0, the pixels Pix1 display black.

Therefore, as illustrated in FIG. 9(E), the pixels Pix1 display the same gradation for the bit B0 and the bit B0b that is a complementary bit of the bit B0, during a period of the two subframes from the time T1 to the time T3. The pixels Pix1 also perform alternate current driving in which the direction of the potential at the liquid crystal LCM is inverted every subframes. The pixels Pix1 are thereby able to prevent burning in the liquid crystal LCM.

Subsequently, in the period of the subframe in which the inverted gradation data in the subframe of the bit B0b are displayed, writing of the normal gradation data in the subframe of the bit B1 (see FIG. 9(A)) into the first signal holding circuits SM11 of the pixels Pix1 is sequentially started. The normal gradation data in the subframe of the bit B1 are then written into the first signal holding circuits SM11 of all of the pixels Pix1 in the image display unit 61. At the time T3 after that writing is ended, a normal trigger pulse TRIG at the "H" level is supplied concurrently to all of the pixels Pix1 which constitute the image display unit 61.

The switches SW12a and SW12b in all of the pixels Pix1 are thereby turned on. Therefore, the normal gradation data in the subframe of the bit B1 stored in the first signal holding circuits SM11 are transferred to the second signal holding circuits SM12 via the switches SW12a and SW12b, and is held by the second signal holding circuits SM12. The normal gradation data in the subframe of the bit B1 is also applied to the reflective electrodes PE. A period for which the normal gradation data in the subframe of the bit B1 is held by the second memories 92 is a period of one subframe from the time T3 to a time T4 at which the next normal trigger pulse TRIG at the "H" level is supplied.

In a period of the subframe in which the normal gradation data in the subframe is applied to the reflective electrodes PE, the common electrode voltage Vcom is set to a voltage smaller than 0 V by the threshold voltage Vtt of the liquid crystal LCM, as illustrated in FIG. 9(D). In the period of one subframe from the time T3 to the time T4, the normal gradation data in the subframe of the bit B1 is applied to the reflective electrodes PE. Therefore, as illustrated in FIG. 9(E), the voltage applied to the liquid crystal LCM becomes 3.3 V+Vtt (=3.3 V −(−Vtt)) when the bit value of the gradation data in the subframe is "1". By contrast, when the bit value of the gradation data in the subframe is "0", the voltage applied to the liquid crystal LCM becomes +Vtt (=0 V −(−Vtt)).

Subsequently, in a period of the subframe in which the normal gradation data in the subframe of the bit B1 are displayed, writing of the inverted gradation data in the subframe of the bit B1b (see FIG. 9(A)) into the first signal holding circuits SM11 of the pixels Pix1 is sequentially started. The inverted gradation data in the subframe of the bit B1b is then written into the first signal holding circuits SM11 of all of the pixels Pix1 in the image display unit 61. At the time T4 after that writing is ended, a normal trigger pulse TRIG at the "H" level is supplied concurrently to all of the pixels Pix1 which constitute the image display unit 61.

The switches SW12a and SW12b in all of the pixels Pix1 are thereby turned on. Therefore, the inverted gradation data in the subframe of the bit B1b stored in the first signal holding circuits SM11 is transferred to the second signal holding circuits SM12 via the switches SW12a and SW12b, and is held by the second signal holding circuits SM12. The inverted gradation data in the subframe of the bit B1b is also applied to the reflective electrodes PE. A period for which the inverted gradation data in the subframe of the bit B1b is held by the second signal holding circuits SM12 is a period of one subframe from the time T4 to a time T5 at which the next normal trigger pulse TRIG of the "H" level is supplied. The inverted gradation data in the subframe of the bit B1b and the normal gradation data in the subframe of the bit B1 are always in a logically inverted relation.

In a period of the subframe in which the inverted gradation data in the subframe is applied to the reflective electrodes PE, the common electrode voltage Vcom is set to a voltage higher than 3.3 V by the threshold voltage Vtt of the liquid crystal LCM, as illustrated in FIG. 9(D). In a period of one subframe from the time T4 to a time T5, the inverted gradation data in the subframe of the bit B1b is applied to the reflective electrodes PE. Therefore, as illustrated in FIG. 9(E), the voltage applied to the liquid crystal LCM becomes −Vtt (=3.3 V −(3.3 V+Vtt)) when the bit value of the gradation data in the subframe is "1". By contrast, when the bit value of the gradation data is "0", the voltage applied to the liquid crystal LCM becomes −3.3 V −Vtt (=0 V −(3.3 V+Vtt)).

Therefore, as illustrated in FIG. 9(E), the pixels Pix1 display the same gradation for the bit B1 and the bit B1b that is a complementary bit of the bit B1, during a period of the two subframes from the time T3 to the time T5. The pixels Pix1 also implement alternate current driving in which the direction of the potential at the liquid crystal LCM is inverted every subframes. The pixels Pix1 are thereby able to prevent burning in the liquid crystal LCM.

Operation similar to that described above is repeated thereafter, and the reflective liquid crystal display device 13 including the pixels Pix1 enable gradation display by a combination of the subframes.

A display period length for the bit B0 and a display period length for the bit B0b, which is a complementary bit thereof, are both the same of a first subframe period length. Furthermore, the display period length for the bit B1 and the display period length for the bit B1b, which is a complementary bit thereof, are both the same of a second subframe period length. However, the first subframe period length and the second subframe period length are not necessarily the same. For example, the second subframe period length is set herein to be twice the first subframe period length. Furthermore, a third subframe period length as the display period length for the bit B2 and the display period length for the bit B2b, which is a complementary bit thereof, is set to be twice the second subframe period length. The same applies to the other subframe periods and each subframe period length is determined to be a predetermined length according to the system, and the number of subframes is also determined to be any number.

Conclusion

The gradation data written into the second memories 92 is the normal gradation data in the subframe and the inverted gradation data in the subframe which are switched every subframes. The common electrode voltage Vcom is alternately switched between predetermined potentials every subframes in synchronization with the writing. The pixels Pix1 thereby enable implement an alternating current driving of positive and negative waveforms of the liquid crystal display elements LC. Therefore, the reflective liquid crystal display device 13 enables suppress burning in the liquid crystal display elements LC and thus increase in reliability.

Furthermore, the liquid crystal display elements LC do not need to be turned off with the reflective electrodes PE and the common electrode CE being set at the same potential during the writing period of the gradation data. Therefore, the reflective liquid crystal display device 13 can eliminate a loss time for displaying the liquid crystal display elements LC in the writing period of the gradation data and thus enables improvement of the gradation. Furthermore, the reflective liquid crystal display device 13 is free from constraint that the liquid crystal display elements LC are unable to perform display during the writing period of the gradation data, and the gradation is thus not sacrificed even for a display with a large number of pixels, such as that of FHD or 4K2K.

Furthermore, since the driving force of the inverters INV1 and INV2 is set larger than the driving force of the inverters INV3 and INV4, the pixels Pix1 can perform gradation display with being stable and accurate.

Furthermore, the pixels Pix1 enable the voltage applied to the liquid crystal display elements LC to be set high and the dynamic range to be increased. The reflective liquid crystal display device 13 thereby can suppress deterioration of contrast and deterioration of brightness. Furthermore, the reflective liquid crystal display device 13 can increase a reflection angle of reflected light.

Applying the reflective liquid crystal display device 13 of the third embodiment that can suppress deterioration of contrast and deterioration of brightness to the WSS array 10 can suppress deterioration of contrast and deterioration of brightness in the output beam 31a to the output beam 31c (see FIG. 1). The WSS array 10 thereby enables improvement of signal/noise (S/N) ratios of the wavelength channels.

Furthermore, applying the reflective liquid crystal display device 13 of the third embodiment that can increase a reflection angle of reflected light to the WSS array 10 of the first embodiment can increase a spatial interval from the output beam 31a to the output beam 31c (see FIG. 1). The WSS array 10 thereby enables improvement of signal/noise (S/N) ratios of the wavelength channels. Or, the WSS array 10 is thus able to output a new output beam while maintaining the spatial interval from the output beam 31a to the output beam 31c. The WSS array 10 thereby can increase the number of the wavelength channel.

Furthermore, in the pixels Pix1, each of the first signal holding circuits SM11 and the second signal holding circuits SM12 is a static random access memory. Therefore, the pixels Pix1 can improve noise resistance.

Fourth Embodiment

Figure 11:
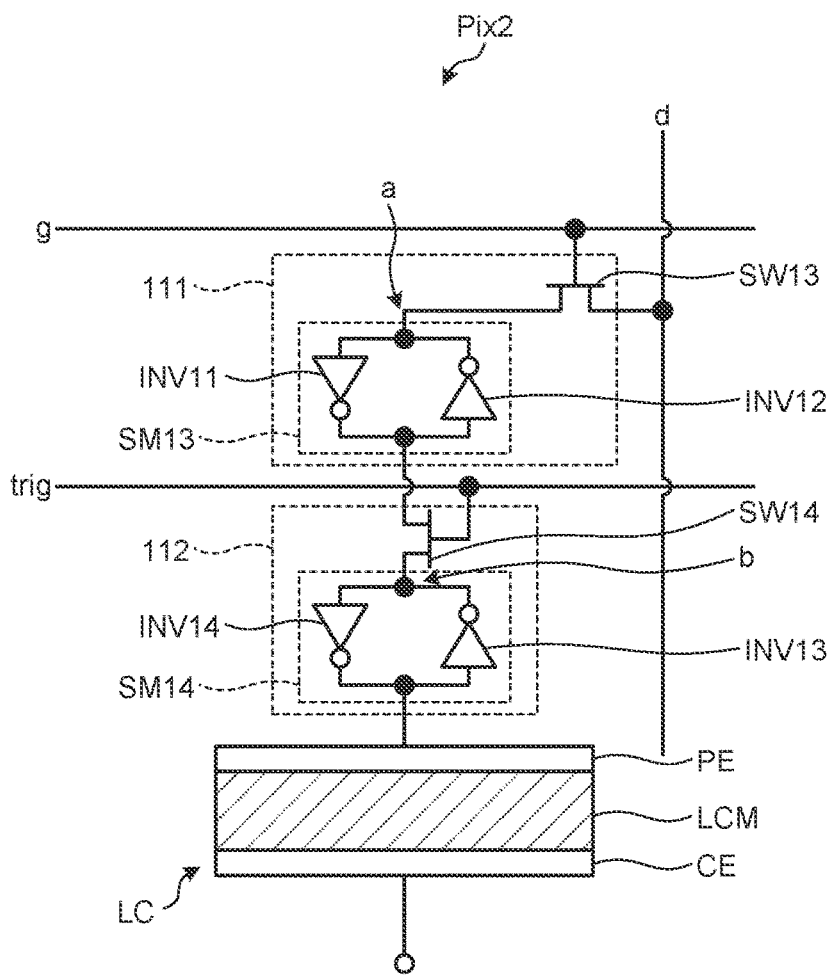
FIG. 11 is a diagram illustrating a circuit configuration of a pixel of a reflective liquid crystal display device of a fourth embodiment.

FIG. 11 is a diagram illustrating a circuit configuration of a pixel of a reflective liquid crystal display device of a fourth embodiment.

The same reference signs will be assigned to components of a pixel Pix2 of the reflective liquid crystal display device of the fourth embodiment that are the same as those of the pixel Pix1 of the third embodiment and description thereof will be omitted.

The pixel Pix2 is provided at an intersection between any one column data line d and any one row scan line g.

The pixel Pix2 includes a first memory 111, a second memory 112, and a liquid crystal display element LC. The first memory 111 includes a switch SW13 and a first signal holding circuit SM13. The second memory 112 includes a switch SW14 and a second signal holding circuit SM14.

Each of the first memory 111 and second memory 112 in the pixel Pix2 is composed of an SRAM.

The switch SW13 corresponds to an example of the "first switching circuit" of the present application. The first signal holding circuit SM13 corresponds to an example of the "first signal holding circuit" of the present application. The first memory 111 corresponds to an example of the "first static random access memory" of the present application. The switch SW14 corresponds to an example of the "second switching circuit" of the present application. The second signal holding circuit SM14 corresponds to an example of the "second signal holding circuit" of the present applica-tion. The second memory 112 corresponds to an example of the "second static random access memory" of the present application.

Similarly to the pixel Pix1 (see FIG. 6), the pixel Pix2 includes two SRAMs, but is characterized in that writing into the first signal holding circuit SM13 and the second signal holding circuit SM14 is performed via the switches SW13 and SW14.

The switch SW13 is composed of an NMOS transistor having a gate connected to the row scan line g, a drain connected to the column data line d, and a source connected to one of input terminals of the first signal holding circuit SM13.

The first signal holding circuit SM13 is a self-holding memory composed of two inverters INV11 and INV12, an output terminal of one of the inverters INV11 and INV12 being connected to an input terminal of the other of the inverters INV11 and INV12. An input terminal of the inverter INV11 is connected to the output terminal of the inverter INV12 and a source of the NMOS transistor which constitutes the switch SW13. The input terminal of the inverter INV12 is connected to the output terminal of the inverter INV11 and a drain of the NMOS transistor which constitutes the switch SW14.

The switch SW14 is composed of an NMOS transistor having a gate connected to a trigger line trig, a drain connected to an output terminal of the first signal holding circuit SM13, and a source connected to an input terminal of the second signal holding circuit SM14.

The second signal holding circuit SM14 is a self-holding memory composed of two inverters INV13 and INV14, an output terminal of one of the inverters INV13 and INV14 being connected to an input terminal of the other of the inverters INV13 and INV14. The input terminal of the inverter INV13 is connected to the output terminal of the inverter INV14 and to a reflective electrode PE. The input terminal of the inverter INV14 is connected to the output terminal of the inverter INV13 and a source of the NMOS transistor which constitutes the switch SW14.

Each of the inverters INV11, INV12, INV13, and INV14 is composed of a CMOS inverter (see FIG. 7), for example.

The pixel Pix2 performs operation similar to the operation described with respect to the third embodiment by reference to the timing chart in FIG. 9.

Firstly, the switches SW13 in multiple pixels Pix2 of one row selected by the normal row scan pulse output from the timing generator 62 are turned on by the normal row scan pulse. The normal gradation data in the subframe output to the column data line d is then sampled by the switches SW13 and are written into the first signal holding circuits SM13. Similarly, the normal gradation data in the subframe are written into the first signal holding circuits SM13 of all of the pixels Pix2 which constitute the image display unit 61. At a time after this writing is ended, a normal trigger pulse TRIG at the "H" level is supplied concurrently to all of the pixels Pix2 which constitutes the image display unit 61.

The switches SW14 in all of the pixels Pix2 are thereby turned on. Therefore, the normal gradation data in the subframe stored in the first signal holding circuits SM13 are transferred at once to the second signal holding circuits SM14 via the switches SW14 and are held by the second signal holding circuits SM14. The normal gradation data in the subframe are also applied to the reflective electrodes PE. A period for which the normal gradation data in the sub-frame are held by the second signal holding circuits SM14 is a period for one subframe until the next normal trigger pulse TRIG at the "H" level is input.

Subsequently, the pixels Pix2 in the image display unit 61 are selected every rows by the normal row scan pulse similarly to the above and the inverted gradation data in the subframe which has a logically inverted value of the previous normal gradation data in the subframe are written into the first signal holding circuits SM13 of the pixels Pix2. When writing of the inverted gradation data in the subframe into the first signal holding circuits SM13 of all of the pixels Pix2 which constitute the image display unit 61 is ended, a normal trigger pulse TRIG at the "H" level is supplied concurrently to all of the pixels Pix2 which constitute the image display unit 61.

The switches SW14 in all of the pixels Pix2 are thereby turned on. Therefore, the inverted gradation data in the subframe stored in the first signal holding circuits SM13 are transferred at once to the second signal holding circuits SM14 via the switches SW14, and are held by the second signal holding circuits SM14. The inverted gradation data in the subframe are also applied to the reflective electrodes PE. A period for which the inverted gradation data in the subframe are held by the second signal holding circuits SM14 is a period for one subframe until the next normal trigger pulse TRIG at the "H" level is input.

Data are written into the first signal holding circuit SM13 via the single switch SW13 as described above. In this case, a driving force of a transistor in the inverter INV11 at an input end as viewed from the switch SW13 is larger than a driving force of a transistor in the inverter INV12 at an output end as viewed from the switch SW13. Furthermore, a driving force of the NMOS transistor which constitutes the switch SW13 is larger than a driving force of a transistor which constitutes the inverter INV12.

This is related to a case in which gradation data in the first signal holding circuit SM13 are rewritten. In particular, when a voltage a near the switch SW13 in the first signal holding circuit SM13 is at the "L" level and data in the column data line d is at the "H" level, the voltage a needs to be made higher than an input voltage (threshold voltage) at which the inverter INV1 is inverted.

That is, the voltage a in a case of the "H" level is determined by a ratio between an electric current in the NMOS transistor which constitutes the inverter INV12 and an electric current in the NMOS transistor which constitutes the switch SW13. The switch SW13 is the NMOS transistor. Therefore, even if a power source voltage VDD at the "H" level is input from the column data line d to the drain when the switch SW13 is on, the voltage output from the source becomes lower than the power source voltage VDD by a threshold voltage Vth of the NMOS transistor. That is, the "H" level voltage of the voltage a becomes a voltage lower than the power source voltage VDD by the threshold voltage Vth. Moreover, at this voltage, the NMOS transistor in the switch SW13 will operate at a voltage around the threshold voltage Vth and almost no electric current will thus flow therethrough. That is, the higher the voltage by which the switch SW13 is conducted, the smaller an amount of the electric current that flows through the switch SW13.

That is, when the voltage a is at the "H" level, in order for the voltage a to reach a voltage equal to or higher than a voltage by which the NMOS transistor is inverted in the inverter INV11, the electric current that flows through the switch SW13 needs to be larger than the electric current that flows through the NMOS transistor composed of the inverter INV12. Therefore, a NMOS transistor a driving force of which is larger than that of the NMOS transistor which constitutes the inverter INV12 is used as a NMOS transistor which constitutes the switch SW13.

A transistor size of the NMOS transistor which constitutes the switch SW13 and a transistor size of the NMOS transistor which constitutes the inverter INV12 need to be determined in consideration of this magnitude relation of the driving force.

Furthermore, data are written into the second signal holding circuit SM14 via the single switch SW14. In this case, a driving force of a transistor in the inverter INV14 at an input end as viewed from the switch SW14 is larger than a driving force of a transistor in the inverter INV13 at an output end as viewed from the switch SW14.

A case in which the normal trigger pulse TRIG becomes the "H" level and the switch SW14 is turned on will now be considered. When the gradation data held by the first signal holding circuit SM13 and the gradation data held by the second signal holding circuit SM14 are different from each other, an output from the inverter INV11 and the output from the inverter INV13 will compete against each other. However, the driving force of the inverter INV11 is larger than the driving force of the inverter INV13. Therefore, the gradation data in the second signal holding circuit SM14 are rewritten by the gradation data in the first signal holding circuit SM13 without the gradation data in the first signal holding circuit SM13 being rewritten by the gradation data in the second signal holding circuit SM14.

Furthermore, a driving force of the NMOS transistor which constitutes the switch SW14 is larger than a driving force of the NMOS transistor which constitutes the inverter INV13.

This is related to a case in which the gradation data in the second signal holding circuit SM14 are written. In particular, when a voltage b near the switch SW14 in the second signal holding circuit SM14 is at the "L" level, the voltage b near the switch SW14 and the gradation data in the first signal holding circuit SM13 are at the "H" level, the voltage b needs to be made higher than a threshold voltage at which the inverter INV14 is inverted.

That is, the voltage b in a case of the "H" level is determined by a ratio between an electric current in the NMOS transistor which constitutes the inverter INV13 and an electric current in the NMOS transistor which constitutes the switch SW14. The switch SW14 is the NMOS transistor. Therefore, even if a power source voltage VDD at the "H" level is input from the first signal holding circuit SM13 to the drain when the switch SW14 is on, the voltage output from the source becomes a voltage lower than the power source voltage VDD by the threshold voltage Vth of the NMOS transistor. That is, the "H" level voltage of the voltage b becomes a voltage lower than the power source voltage VDD by the threshold voltage Vth. Moreover, at this voltage, the NMOS transistor in the switch SW14 will operate at a voltage around the threshold voltage Vth and almost no electric current will thus flow therethrough. That is, the higher the voltage b by which the switch SW14 is conducted, the smaller an amount of electric current that flows through the switch SW14.

That is, when the voltage b is at the "H" level, in order for the voltage b to reach a voltage equal to or higher than a voltage by which the NMOS transistor is inverted in the inverter INV14, the electric current that flows through the switch SW14 needs to be larger than the electric current that flows through the NMOS transistor composed of the inverter INV13. Therefore, a NMOS transistor a driving force of which is larger than that of the NMOS transistor which constitutes the inverter INV13 is used as a NMOS transistor which constitutes the switch SW14.

A transistor size of the NMOS transistor which constitutes the switch SW14 and a transistor size of the NMOS transistor which constitutes the inverter INV13 need to be determined in consideration of this magnitude relation of the driving force When the gradation data held in the first memories 111 are transferred at once to the second memories 112 in all of the pixels Pix2, the normal trigger pulse TRIG becomes the "L" level and the switches SW14 are turned off. Therefore, the second memories 112 can hold the transferred gradation data and fix the potential in the reflective electrodes PE at a potential according to the gradation data for any period (a period for one subframe herein).

Each of the switches SW13 and SW14 may be composed of a PMOS transistor. In this case, the polarity opposite to that in the description above is applicable and illustration and description thereof will thus be omitted.

Furthermore, each of the switches SW13 and SW14 may be a transmission gate composed of a PMOS transistor and an NMOS transistor.

Conclusion

The pixel Pix2 has an effect similar to that of the pixel Pix1 of the third embodiment.

In addition, the pixel Pix2 has an effect of enabling downsizing. A reason for this is as follows. Each of the inverter INV11 to inverter INV14 is composed of two transistors. Therefore, each of the pixels Pix2 is composed of ten transistors in total which is less than the number of transistors (twelve transistors in total) composed of the pixel Pix1.

Fifth Embodiment

The pixel Pix1 of the third embodiment requires twelve transistors. The pixel Pix2 of the fourth embodiment requires ten transistors.

Furthermore, there is a demand for the liquid crystal display element LC to be driven at 3 V to 5 V, and the transistors need to be driven at 3.3 V or 5 V. Therefore, a high-breakdown voltage and large-size transistor need to be used.

Furthermore, to infallibly rewrite data in the pixels Pix1 and Pix2 each using two SRAMs, the pixels Pix1 and Pix2 need to be designed in consideration of the transistor sizes for the switches and SRAMs. A transistor that needs to be increased in a driving force needs to be increased in a size.

However, the number of the pixels in a reflective liquid crystal display device is increasing year after year, and there is a strong demand for downsizing of the pixel. Thus the two-stage memory like the one illustrated in FIG. 5 needs to be formed with a smaller pixel pitch and a smaller number of transistors.

A pixel Pix3 of a fifth embodiment can meet the above described demands.

Figure 12:
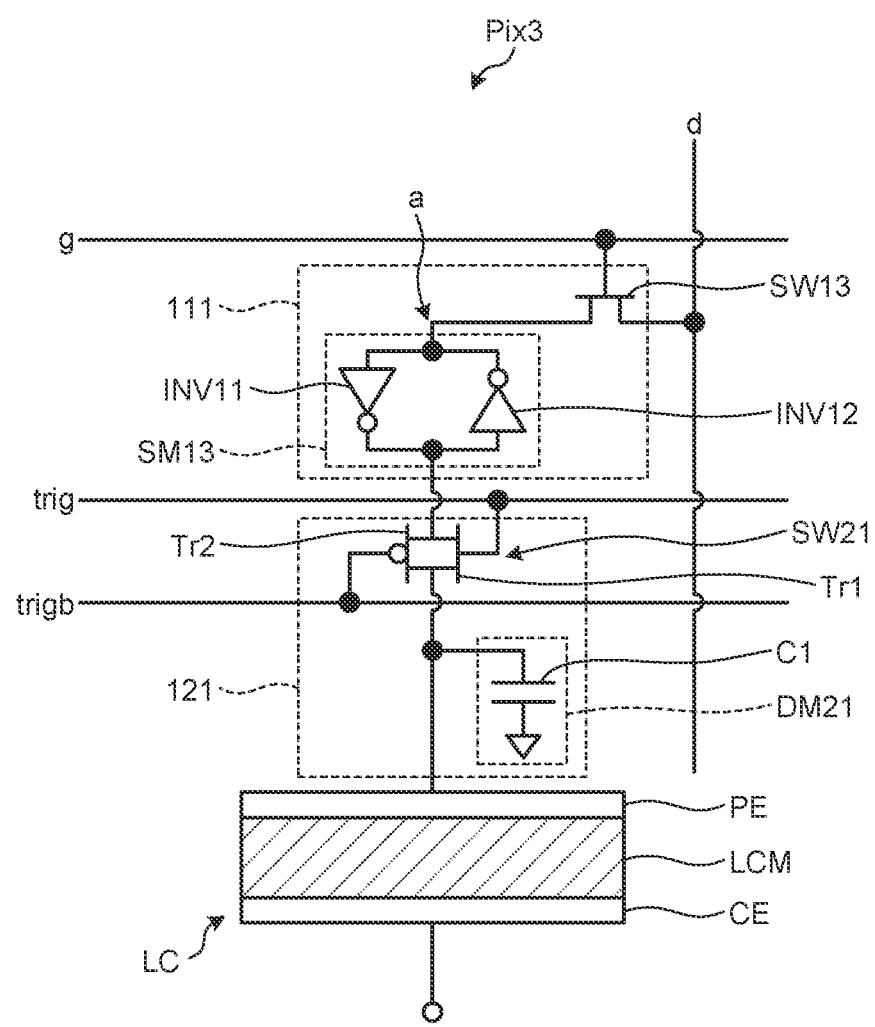
FIG. 12 is a diagram illustrating a circuit configuration of a pixel of a reflective liquid crystal display device of a fifth embodiment.

FIG. 12 is a diagram illustrating a circuit configuration of a pixel of a reflective liquid crystal display device of the fifth embodiment.

The same reference signs will be assigned to components of a pixel Pix3 of the reflective liquid crystal display device of the fifth embodiment that are the same as those of the pixel Pix1 of the third embodiment or the pixel Pix2 of the fourth embodiment, and description thereof will be omitted.

The pixel Pix3 is provided at an intersection between any one column data line d and any one row scan line g.

The pixel Pix3 includes a first memory 111, a second memory 121, and a liquid crystal display element LC. The second memory 121 includes a switch SW21 and a second signal holding circuit DM21.

In the pixel Pix3, the first memory 111 includes an SRAM and the second memory 121 includes a dynamic random access memory (DRAM).

A switch SW13 corresponds to an example of the "first switching circuit" of the present application. A first signal holding circuit SM13 corresponds to an example of the "first signal holding circuit" of the present application. The first memory 111 corresponds to an example of the "first static random access memory" of the present application. The switch SW21 corresponds to an example of the "second switching circuit" of the present application. The second signal holding circuit DM21 corresponds to an example of the "second signal holding circuit" of the present application. The second memory 121 corresponds to an example of a "first dynamic random access memory" of the present application.

The switch SW21 is a publicly known transmission gate including an NMOS transistor Tr1 and a PMOS transistor Tr2 with their drains being connected to each other and their sources being connected to each other. The NMOS transistor Tr1 has a gate connected to a trigger line trig and the PMOS transistor Tr2 has a gate connected to an inversion trigger line trigb.

Furthermore, the switch SW1 has one terminal connected to the first signal holding circuit SM13 and the other terminal connected to the second signal holding circuit DM21 and a reflective electrode PE. Therefore, the switch SW21 is turned on when the normal trigger pulse TRIG is at the "H" level (in this case, the inverted trigger pulse TRIGB is at the "L" level). Therefore, the switch SW21 read the gradation data from the first signal holding circuit SM13 and transfer the read gradation data to the second signal holding circuit DM21 and the reflective electrode PE. Furthermore, the switch SW21 is turned off when the normal trigger pulse TRIG is at the "L" level (in this case, the inverted trigger pulse TRIGB is at the "H" level) and the gradation data are not read from the first signal holding circuit SM13.

Since the switch SW21 is a publicly known transmission gate composed of the NMOS transistor Tr1 and the PMOS transistor Tr2, the switch SW21 can turn on and off a voltage ranging from a reference voltage GND to a power source voltage VDD. That is, when a signal applied to the gates of the NMOS transistor Tr1 and the PMOS transistor Tr2 has a voltage ("L" level) of the reference voltage GND, the PMOS transistor Tr2 cannot be conducted. Instead, the NMOS transistor Tr1 can be conducted at a low resistance. By contrast, when a signal applied to the gates of the NMOS transistor Tr1 and PMOS transistor Tr2 is a voltage ("H" level) of the power source voltage VDD, the NMOS transistor Tr1 cannot be conducted. Instead, the POS transistor Tr2 can be conducted at a low resistance. Therefore, the transmission gate which constitutes the switch SW21 is on/off controlled by the normal trigger pulse TRIG and the inverted trigger pulse TRIGB. This control enables the switch SW21 to perform switching with a low resistance and a high resistance over a voltage range from the reference voltage GND to the power source voltage CDD.

The second signal holding circuit DM21 is composed of a capacitance C1. A case in which the gradation data in the first signal holding circuit SM13 and the gradation data in the second signal holding circuit DM21 are different from each other will now be discussed. The gradation data in the second signal holding circuit DM21 needs to be rewritten by the gradation data in the first signal holding circuit SM13 when the switch SW21 is turned on and the gradation data in the first signal holding circuit SM13 is transferred to the second signal holding circuit DM21.

When the gradation data in the capacitance C1 which constitutes the second signal holding circuit DM21 is to be rewritten, the gradation data is changed by charging or discharging. The charging and discharging of the capacitance C1 are driven by an output signal from the inverter INV11.

When the gradation data in the capacitance C1 is to be rewritten from the "L" level to the "H" level by charging, the output signal from the inverter INV11 is "H". At that time, the PMOS transistor (see the PMOS transistor Ptr in FIG. 7) which constitutes the inverter INV11 is on and the NMOS transistor (see the NMOS transistor Ntr in FIG. 7) is off. Therefore, the capacitance C1 is charged by the power source voltage VDD connected to the source of the PMOS transistor in the inverter INV11.

By contrast, when the gradation data in the capacitance C1 is rewritten from the "H" level to the "L" level by discharging, the output signal from the inverter INV11 is at the "L" level. At that time, the NMOS transistor (see the NMOS transistor Ntr in FIG. 7) which constitutes the inverter INV11 is on and the PMOS transistor (see the PMOS transistor Ptr in FIG. 7) is off. Therefore, an electric charge in the capacitance C1 is discharged to the reference voltage GND via the NMOS transistor in the inverter INV11. Since the switch SW21 has an analog switch configuration using the transmission gate, high speed charging and discharging of the capacitance C1 is possible.

Furthermore, a driving force of the inverter INV11 is set larger than a driving force of the inverter INV12. Therefore, the inverter INV11 can charge and discharge the capacitance C1 which constitutes the second signal holding circuit DM21 at high speed.

The electric charge accumulated in the capacitance C1 may affect an input gate of the inverter INV12 when the switch SW21 is turned on. However, since the driving force of the inverter INV11 is set larger than that of the inverter INV12, charging and discharging of the capacitance C1 by the inverter INV11 is given priority over data inversion by the inverter INV12. Therefore, the gradation data in the first signal holding circuit SMM13 will not be rewritten by the gradation data in the second signal holding circuit DM21.

The pixel Pix3 can transfer one bit gradation data from the first signal holding circuit SM13 to the second signal holding circuit DM21 by a voltage range from the reference voltage GND to the power source voltage VDD. Therefore, when the pixel Pix3 is driven by the same power source voltage VDD, the voltage applied to the liquid crystal display elements LC can be set high and the dynamic range can be increased.

In addition, the pixel Pix3 has an effect of downsizing. The first reason for this is as follows. Each of the inverters INV11 and INV12 is composed of two transistors. Therefore, the pixel Pix3 is composed of seven transistors and one capacitance C1, and can be composed of a smaller number of elements than the pixel Pix1 (twelve transistors in total) and the pixel Pix2 (ten transistors in total). The second reason is that as described hereinafter, the first signal holding circuit SM13, the second signal holding circuit DM21, and the reflective electrode PE can be effectively arranged in a height direction of the element.

Figure 13:
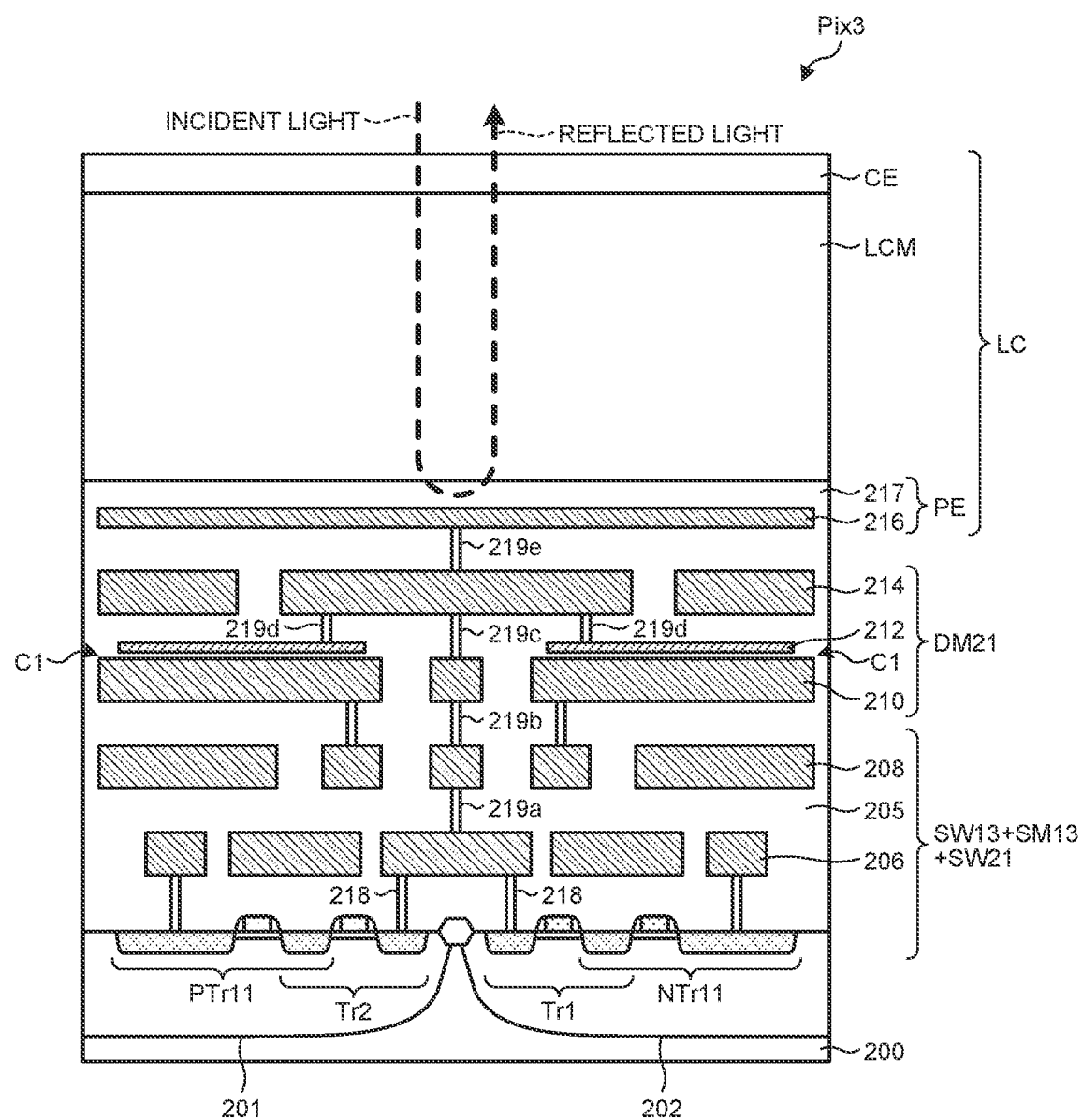
FIG. 13 is a diagram illustrating a sectional configuration of the pixel of the reflective liquid crystal display device of the fifth embodiment.

FIG. 13 is a diagram illustrating a sectional configuration of the pixel of the reflective liquid crystal display device of the fifth embodiment.

A metal-insulator-metal (MIM) capacitance that forms a capacitance between wirings, a diffusion capacitance that forms a capacitance between a substrate and polysilicon, or a poly-insulator-poly (PIP) capacitance that forms a capacitance between two polysilicon layers, for example, may be used as the capacitance C1. FIG. 13 illustrates a sectional configuration of the reflective liquid crystal display device when the capacitance C1 is composed of MIM.

In FIG. 13, a PMOS transistor Ptr11 in the inverter INV11 and the PMOS transistor Tr2 in the switch SW21 are formed on an N well 201 formed in a silicon substrate 200, and their drains are connected to each other by a diffusion layer being shared. Furthermore, the NMOS transistor Ntr11 in the inverter INV11 and the NMOS transistor Tr1 in the switch SW21 are formed on a P well 202 formed in the silicon substrate 200, and their drains are connected to each other by a diffusion layer being shared. The NMOS transistor and the PMOS transistor which constitutes the inverter INV12 are not illustrated in FIG. 13.

Furthermore, a first metal layer 206, a second metal layer 208, a third metal layer 210, an electrode 212, a fourth metal layer 214, and a fifth metal layer 216 are layered over the PMOS transistors PTr11 and Tr2 and the NMOS transistors Tr1 and NTr11, with an interlayer insulator 205 being interposed between these metal layers. The fifth metal layer 216 constitutes the reflective electrode PE formed in each pixel. Two diffusion layers respectively forming the sources of the NMOS transistor Tr1 and PMOS transistor Tr2 which constitute the switch SW21 are respectively connected electrically to the first metal layer 206 by two contacts 218. Furthermore, the two diffusion layers are electrically connected to the second metal layer 208, third metal layer 210, fourth metal layer 214, and fifth metal layer 216, via through holes 219a, 219b, 219c, and 219e. That is, the source of each of the NMOS transistor Tr1 and PMOS transistor Tr2 which comprises the switch SW21 is electrically connected to the reflective electrode PE.

Furthermore, a passivation film (PSV) 217 serving as a protective film is formed on the reflective electrode PE (the fifth metal layer 216) and is arranged separately from and opposite to a common electrode CE that is a transparent electrode. A space between the reflective electrode PE and the common electrode CE is filled and sealed with the liquid crystal LCM and the liquid crystal display element LC is thereby formed.

An electrode 212 is formed on the third metal layer 210 via the interlayer insulator 205. This electrode 212, the third metal layer 210, and the interlayer insulator 205 between the electrode 212 and third metal 210 constitute the capacitance C1.

When the capacitance C1 is composed of MIM, the first signal holding circuit SM13, the switch SW13, and the switch SW12 can be composed of the transistors on the silicon substrate 200 and the wirings of the first metal layer 206 and the second metal layer 208. Furthermore, the second signal holding circuit DM21 can be composed of MIM wiring utilizing the third metal 210 above the transistors.

The electrode 212 is electrically connected to the fourth metal layer 214 via a through hole 219d. Furthermore, the fourth metal layer 214 is electrically connected to the reflective electrode PE via the through hole 219e. Therefore, the capacitance C1 is electrically connected to the reflective electrode PE.

Light from a light source not illustrated in the drawings is transmitted through the common electrode CE and the liquid crystal LCM, is incident on and is reflected by the reflective electrode PE (the fifth metal layer 216), runs in reverse through the path the light came from, and passes through the common electrode CE to be output.

In the pixel Pix3, the first signal holding circuit SM13, the second signal holding circuit DM21, and the reflective electrode PE can be effectively arranged in the height direction by allocating the fifth metal layer 216 to the reflective electrode PE, as illustrated in FIG. 13. Therefore, the pixel Pix3 can be downsized. The pixel Pix3 thereby can be composed of a pixel having a pitch of 3 μm or less, for example, with transistors of a power source voltage of 3.3 V. The pixel having the 3 μm pitch can provide a liquid crystal display panel having a diagonal length of 0.55 inches, 4000 pixels in the horizontal direction, and 2000 pixels in the vertical direction.

The pixel Pix3 performs operation similar to the operation described with respect to the third embodiment by reference to the timing chart in FIG. 9.

Firstly, the switches SW13 in the pixels Pix3 of one row selected by the normal row scan pulse output from the timing generator 62 are turned on by the normal row scan pulse. The normal gradation data in the subframe output to the column data line d is then sampled by the switch SW13 and written into the first signal holding circuit SM13. Similarly, the normal gradation data in the subframe is written into the first signal holding circuits SM13 of all of the pixels Pix3 which constitute the image display unit 61. At a time after this writing operation is ended, the normal trigger pulse TRIG at the "H" level and the inverted trigger pulse TRIGB at the "L" level are supplied concurrently to all of the pixels Pix3 which constitute the image display unit 61.

The switches SW21 in all of the pixels Pix3 are thereby turned on. Therefore, the normal gradation data in the subframe stored in the first signal holding circuits SM13 are transferred at once to the second signal holding circuits DM21 via the switches SW21 and are held by the second signal holding circuits DM21. The normal gradation data in the subframe are also applied to the reflective electrodes PE. A period for which the normal gradation data in the subframe are held by the second signal holding circuits DM21 is a period for one subframe until the next normal trigger pulse TRIG at the "H" level and the next inverted trigger pulse TRIGB at the "L" level are input.

Subsequently, the pixels Pix3 in the image display unit 61 are selected every rows by the normal row scan pulses similarly to the above, and the inverted gradation data in the subframe which has a logically inverted value of the previous normal gradation data in the subframe are written into the first signal holding circuits SM13 of the pixels Pix3. When writing of the inverted gradation data in the subframe into the first signal holding circuits SM13 of all of the pixels Pix3 in the image display unit 61 is ended, the normal trigger pulse TRIG at the "H" level and the inverted trigger pulse TRIGB at the "L" level are concurrently supplied to all of the pixels Pix3.

The switches SW21 in all of the pixels Pix3 are thereby turned on. Therefore, the inverted gradation data in the subframe stored in the first signal holding circuits SM13 are transferred at once to the second signal holding circuits DM21 via the switches SW21, and are held by the second signal holding circuits DM21. The inverted gradation data in the subframe are also applied to the reflective electrodes PE. A period for which the inverted gradation data in the subframe are held by the second signal holding circuits DM21 is a period of one subframe until the next normal trigger pulse TRIG at the "H" level and the inverted trigger pulse TRIGB at the "L" level are input.

Each of the switches SW13 may be composed of a PMOS transistor. In this case, the polarity opposite to that in the description above is applicable and illustration and description thereof will thus be omitted.

Furthermore, each of the switches SW13 may be a transmission gate composed of a PMOS transistor and an NMOS transistor.

Furthermore, each of the switches SW21 may be composed of a PMOS transistor or an NMOS transistor.

Conclusion

The pixel Pix3 has effects similar to those of the pixel Pix1 and Pix2 of the third and fourth embodiments.

In addition, the pixel Pix3 has an effect of downsizing.

Sixth Embodiment

Figure 14:
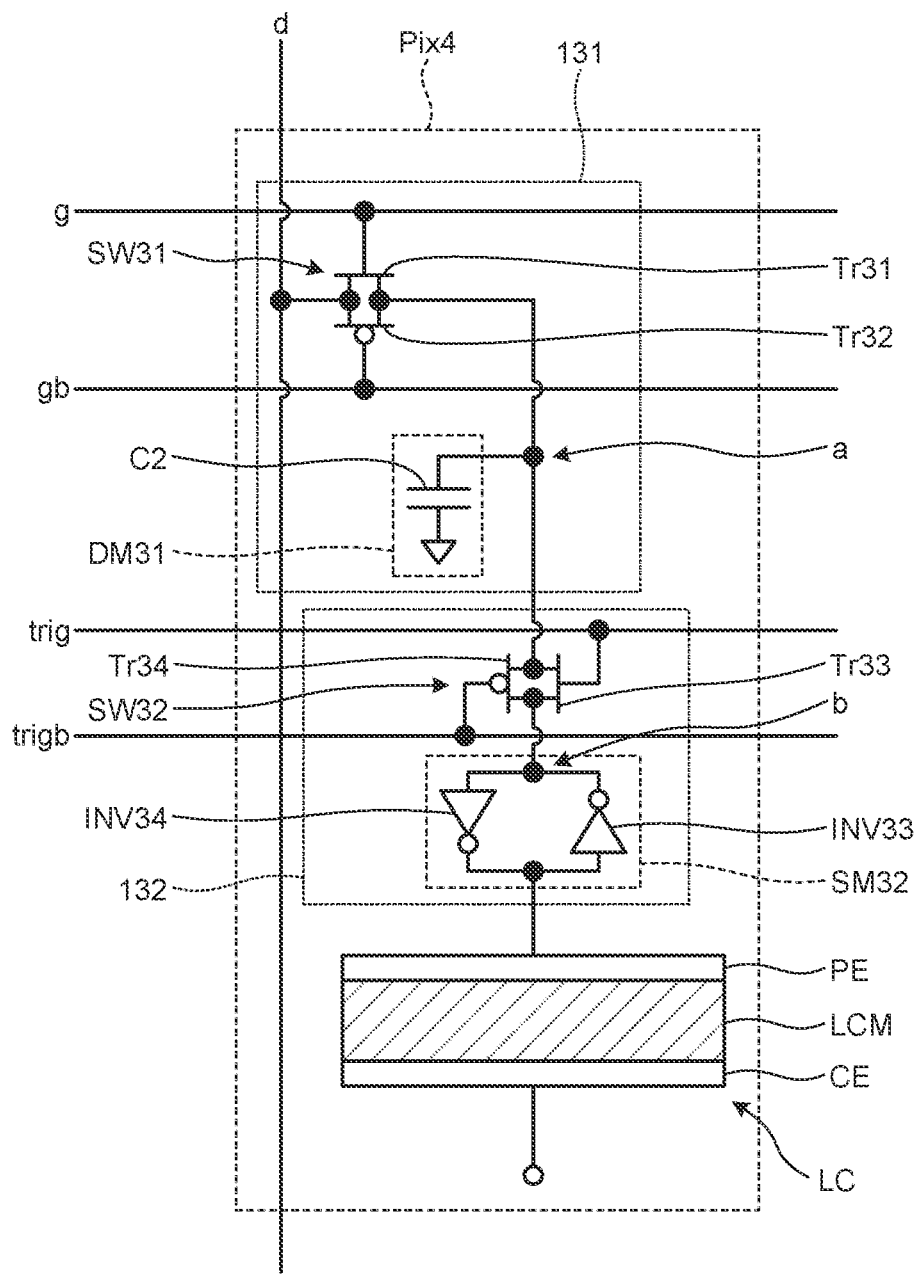
FIG. 14 is a diagram illustrating a circuit configuration of a pixel of a reflective liquid crystal display device of a sixth embodiment.

FIG. 14 is a diagram illustrating a circuit configuration of a pixel of a reflective liquid crystal display device of a sixth embodiment.

The same reference signs will be assigned to components of a pixel Pix4 of the reflective liquid crystal display device of the sixth embodiment that are the same as those of the pixels Pix1 to Pix3 of the third to fifth embodiments and description thereof will be omitted.

The pixel Pix4 is provided at an intersection between any one column data line d and any pair of a row scan line g and an inverted row scan line gb.

The pixel Pix4 includes a first memory 131, a second memory 132, and a liquid crystal display element LC. The first memory 131 includes a switch SW31 and a first signal holding circuit DM31. The second memory 132 includes a switch SW32 and a second signal holding circuit SM32.

In the pixel Pix4, the first memory 131 is composed of a DRAM and the second memory 132 is composed of an SRAM.

The switch SW31 corresponds to an example of the "first switching circuit" of the present application. The first signal holding circuit DM31 corresponds to an example of the "first signal holding circuit" of the present application. The first memory 131 corresponds to an example of the "first dynamic random access memory" of the present application. The switch SW32 corresponds to an example of the "second switching circuit" of the present application. The second signal holding circuit SM32 corresponds to an example of the "second signal holding circuit" of the present application. The second memory 132 corresponds to an example of the "first static random access memory" of the present application.

The switch SW31 is a publicly known transmission gate composed of an NMOS transistor Tr31 and a PMOS transistor Tr32 with their drains being connected to each other and their sources being connected to each other. The NMOS transistor Tr31 has a gate connected to the row scan line g and the PMOS transistor Tr32 has a gate connected to the inverted row scan line gb.

Furthermore, the switch SW31 has one terminal connected to the column data line d and the other terminal connected to the first signal holding circuit DM31. Therefore, when the normal row scan pulse is at the "H" level (in this case, the inverted row scan pulse is at the "L" level), the switch SW31 is turned on, the gradation data in the column data line d is read and transferred to the first signal holding circuit DM31. Furthermore, when the normal row scan pulse is at the "L" level (in this case, the inverted row scan pulse is at the "H" level), the switch SW31 is turned off and the gradation data in the column data line d is not read.

Since the switch SW31 is a publicly known transmission gate composed of the NMOS transistor Tr31 and the PMOS transistor Tr32, the switch SW31 can turn on and off a voltage ranging from a reference voltage GND to a power source voltage VDD. That is, when a signal applied to the gates of the NMOS transistor Tr31 and PMOS transistor Tr32 has a voltage ("L" level) of the reference voltage GND, the PMOS transistor Tr32 cannot be conducted. Instead, the NMOS transistor Tr31 can be conducted at a low resistance. By contrast, when the signal applied to the gates of the NMOS transistor Tr31 and PMOS transistor Tr32 has a voltage ("H" level) of the power source voltage VDD, the NMOS transistor Tr31 cannot be conducted. Instead, the PMOS transistor Tr32 can be conducted at a low resistance. Therefore, by on/off controlling of the transmission gate which constitutes the switch SW31 by the normal trigger pulse TRIG and the inverted trigger pulse TRIGB, a voltage ranging from the reference voltage GND to the power source voltage VDD can be switched with a low resistance and a high resistance.

The first signal holding circuit DM31 is composed of a capacitance C2. A case in which the gradation data in the column data line d and the gradation data in the first signal holding circuit DM31 are different from each other will now be considered. When the switch SW31 has been turned on and the gradation data in the column data line d has been transferred to the first signal holding circuit DM31, the gradation data in the first signal holding circuit DM31 needs to be rewritten by the gradation data in the column data line d.

When the gradation data in the capacitance C2 which constitutes the first signal holding circuit DM31 is to be rewritten, the gradation data is changed by charging or discharging. When the gradation data in the column data line d is to be transferred to the capacitance C2, the gradation data is written by transferring an electric charge between the data line capacitance of the column data line d and the capacitance C2. A capacitance ratio of the data line capacitance of the column data line d to the capacitance C2 is usually large at about 1000:1. Therefore, in the pixel Pix4, the gradation data in the capacitance C2 can be rewritten infallibly.

The switch SW32 is a publicly known transmission gate composed of an NMOS transistor Tr33 and a PMOS transistor Tr34 with their drains being connected to each other and their sources being connected to each other. The NMOS transistor Tr33 has a gate connected to a trigger line trig and the PMOS transistor Tr34 has a gate connected to an inverted trigger line trigb.

Furthermore, the switch SW32 has one terminal connected to the first signal holding circuit DM31 and the other terminal connected to the second signal holding circuit SM32. Therefore, when the normal trigger pulse TRIG is at the "H" level (in this case, the inverted trigger pulse TRIGB is at the "L" level), the switch SW32 is turned on and the gradation data in the first signal holding circuit DM31 is read and transferred to the second signal holding circuit SM32. Furthermore, when the normal trigger pulse TRIG is at the "L" level (in this case, the inverted trigger pulse TRIGB is at the "H" level), the switch SW32 is turned off and the gradation data is not read from the first signal holding circuit DM31.

The second signal holding circuit SM32 is a self-holding memory composed of two inverters INV33 and INV34, an output terminal of one of the inverters INV33 and INV34 being connected to an input terminal of the other of the inverters INV33 and INV34. An input terminal of the inverter INV33 is connected to an output terminal of the inverter INV34 and to the reflective electrode PE. An input terminal of the inverter INV34 is connected to an output terminal of the inverter INV33 and to the switch SW32.

Each of the inverters INV33 and INV34 has a configuration of a CMOS inverter (see FIG. 7), for example.

Data are written into the second signal holding circuit SM32 via the single switch SW32 as described above. In this case, a driving force of a transistor in the inverter INV34 at an input end as viewed from the switch SW32 is larger than a driving force of a transistor in the inverter INV33 at an output end as viewed from the switch SW32. Furthermore, a driving force of the NMOS transistor which constitutes the switch SW32 is larger than a driving force of a transistor which constitutes the inverter INV33. Data is thereby easily input from the capacitance C2 to the second signal holding circuit SM32, and is thereby difficult to be input from the liquid crystal display element LC to the second signal holding circuit SM32.

When the switch SW32 is turned on, the electric charge accumulated in the capacitance C2 drives an input gate of the inverter INV34, and the gradation data in the second signal holding circuit SM32 is rewritten. When the switch SW32 is turned on, an output from the inverter INV33 may affect the capacitance C2. However, a capacitance at an input end of the inverter INV33 is just a gate capacitance of the inverter INV33 and a liquid crystal capacitance of the liquid crystal display element LC, and is much less than a gate capacitance of the inverter INV34 and the capacitance C2. Furthermore, the driving force of the inverter INV34 is set larger than that of the inverter INV33. Therefore, driving of the inverter INV34 by the capacitance C2 is given priority over that by the output from the inverter INV33, and the gradation data in the capacitance C2 will not be rewritten by the gradation data in the second signal holding circuit SM32.

Furthermore, the gradation data in the capacitance C2 derives from the electric charge transferred from the column data line d. Furthermore, an influence of a gate feedthrough generated when the NMOS transistor and the PMOS transistor which constitute the switch SW31 are turned off occurs. Therefore, the potential of the capacitance C2 is fixed with potential fluctuation, and the voltage thereof is shifted in a direction in which the dynamic range is decreased from the reference voltage GND and the power source voltage VDD. However, the voltage finally applied to the reflective electrode PE is shaped by the second signal holding circuit SM32, and the accurate reference voltage GND and the power source voltage VDD will be applied. Therefore, the dynamic range of the pixel Pix4 can be widened.

Furthermore, when diffusion electrode portions of the transistors which constitute the switches SW31 and SW32 and connected to the capacitance C2 are exposed to light, a leakage current may be generated and the electric charge held in the capacitance C2 may be reduced and potential fluctuation may be caused.

However, the voltage held in the capacitance C2 is a voltage for driving the second signal holding circuit SM32. Therefore, even if the voltage held in the capacitance C2 undergoes some fluctuation, the fluctuation will not affect the voltage in the reflective electrode PE as long as the voltage does not fluctuate to exceed a threshold value at which the second signal holding circuit SM32 can hold the gradation data at the "L" level or "H" level. The voltage in the reflective electrode PE applied to the liquid crystal display LCM is supplied from the second signal holding circuit SM32. When the voltage in the reflective electrode PE is at the "H" level, the PMOS transistor in the inverter INV34 which constitutes the second signal holding circuit SM32 is on, and the power source voltage VDD is applied to the reflective electrode PE. When the voltage in the reflective electrode PE is at the "L" level, the NMOS transistor in the inverter INV34 which constitutes the second signal holding circuit SM32 is on and the reference voltage GND is applied to the reflective electrode PE. Therefore, the voltage in the reflective electrode PE is not affected by a leakage current due to light, and the reflective electrode PE can apply a stable voltage to the liquid crystal LCM.

Even if the voltage in the capacitance C2 fluctuates by, for example, the transfer of the electric charge, the gate feedthrough, or the leakage by light, as described above, the fluctuation is not problematic as long as the gradation data in the second signal holding circuit SM32 can be rewritten.

Therefore, the switch SW31 which constitutes the first memory 131 or the switch SW32 which constitutes the second memory 132 does not need to be a complementary switch using an NMOS transistor and a PMOS transistor.

For example, a case in which the switch SW31 and switch SW32 are formed of the NMOS transistors will now be considered. In this case, the switch SW31 and the switch SW32 can output a voltage of VDD–Vth including the substrate effect as the "H" level voltage of an input signal. That is, when the switch SW31 is composed of only the NMOS transistor, even if a voltage of 3.3 V is supplied to the column data line d, a voltage a at a connection point between the switch SW31 and the capacitance C2 will be VDD–Vth or lower, for example, 2.5 V. Therefore, a voltage of 2.5 V is accumulated in the capacitance C2. Subsequently, the switch SW32 is turned on and the gradation data in the second signal holding circuit SM32 is rewritten. When the switch SW32 also includes only the NMOS transistors, a voltage b at a connection point between the switch SW32 and the second signal holding circuit SM32 will be 2.5 V, similarly to the voltage a. However, if the voltage b is equal to or higher than VDD/2, that is, 1.65 V, the "H" level to the second signal holding circuit SM32 (the "L" level is input to the reflective electrode PE as the output) can be input. Therefore, in the second signal holding circuit SM32, both the gradation data of "H" level and the gradation data of "L" level can be written.

Each of the switches SW13 may be composed of a PMOS transistor. In this case, the polarity opposite to that in the description above is applicable and illustration and description thereof will thus be omitted.

As described above, the switch SW31 or the switch SW32 may be a switch using one NMOS transistor, instead of a complementary switch. In this case, since the number of the transistors which constitute one pixel becomes smaller, the pixel Pix4 has an effect of further downsizing.

A logically inverted voltage of the voltage in the capacitance C2 is applied to the reflective electrode PE. Therefore, as gradation data to be written into the pixel Pix4, inverted data of desired data (voltage) to be applied to the reflective electrode PE needs to be input.

The pixel Pix4 has an effect of downsizing. The first reason for this is as follows. Each of the inverters INV33 and INV34 is composed of two transistors. Therefore, the pixel Pix4 is composed of eight transistors in total and one capacitance C2, and can be composed of a smaller number of elements than the pixel Pix1 (twelve transistors in total) and the pixel Pix2 (ten transistors in total). Furthermore, in addition to the first reason, the second reason is that, as described hereinafter, the first signal holding circuit DM31, the second signal holding circuit SM32, and the reflective electrode PE can be effectively arranged in a height direction of the elements.

Figure 15:
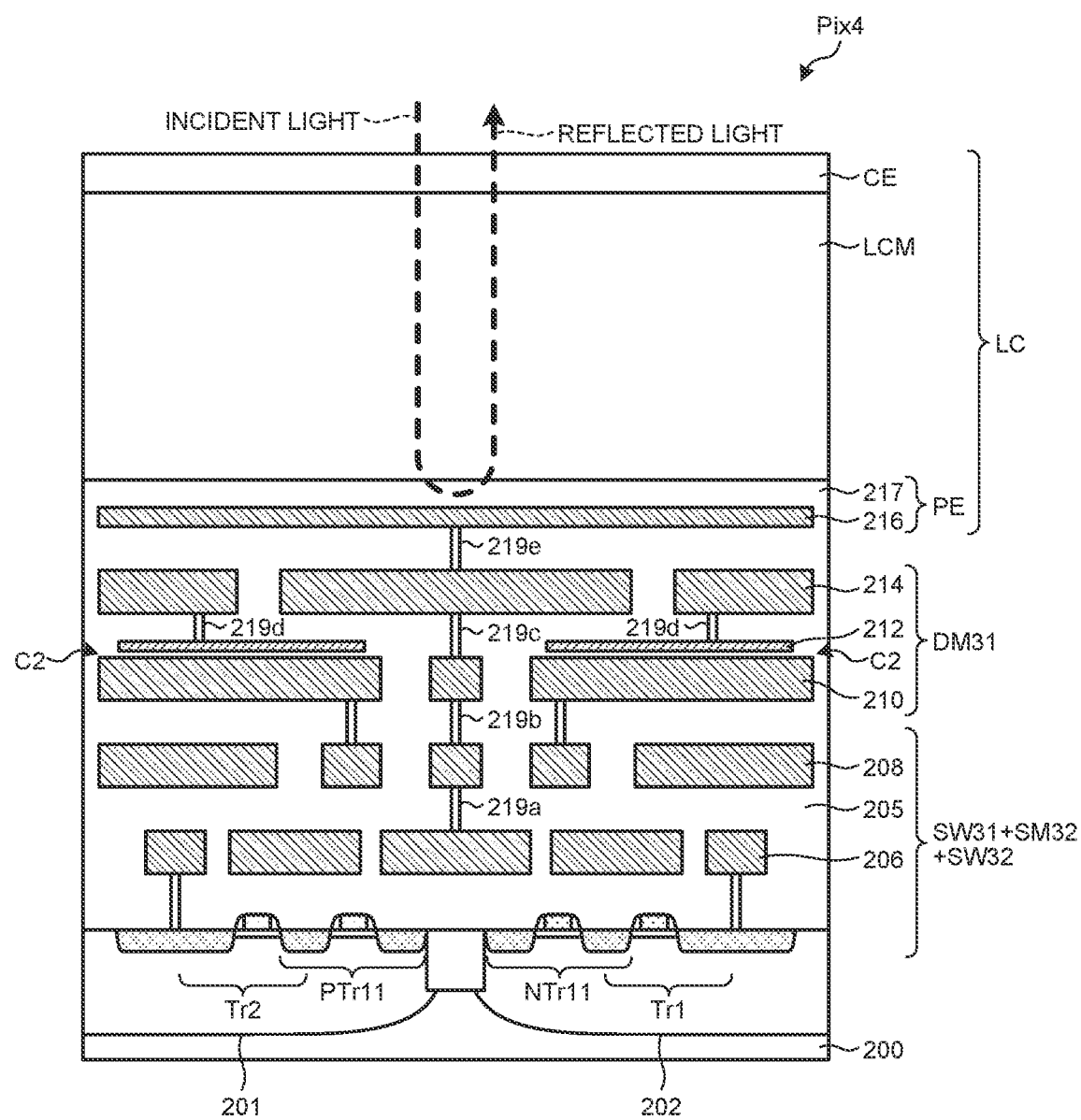
FIG. 15 is a diagram illustrating a sectional configuration of the pixel of the reflective liquid crystal display device of the sixth embodiment.

FIG. 15 is a diagram illustrating a sectional configuration of the pixel of the reflective liquid crystal display device of the sixth embodiment.

A metal-insulator-metal (MIM) capacitance, a diffusion capacitance, or a poly-insulator-poly (PIP) capacitance, for example, may be used as the capacitance C2. FIG. 15 illustrates a sectional configuration of the reflective liquid crystal display device when the capacitance C2 is composed of MIM.

In FIG. 15, a PMOS transistor Ptr11 in the inverter INV33 and the PMOS transistor Tr2 in the switch SW32 are formed on an N well 201 formed in a silicon substrate 200, and their drains are connected to each other by a diffusion layer being shared. Furthermore, the NMOS transistor Ntr11 in the inverter INV33 and the NMOS transistor Tr1 in the switch SW32 are formed on a P well 202 formed in the silicon substrate 200, and their drains are connected to each other by a diffusion layer being shared. The NMOS transistor and the PMOS transistor which constitute the inverter INV34 are not illustrated in FIG. 13.

Furthermore, a first metal layer 206, a second metal layer 208, a third metal layer 210, an electrode 212, a fourth metal layer 214, and a fifth metal layer 216 are layered over the PMOS transistors Tr2 and PTr11 and the NMOS transistors NTr11 and Tr1 with an interlayer insulator 205 being interposed between these metal layers. The fifth metal layer 216 constitutes the reflective electrode PE formed in each pixel. Diffusion layers which constitute drains of the unillustrated NMOS transistor and PMOS transistor which constitute the inverter INV34, a gate electrode of the NMOS transistor NTr11, and a gate electrode of the PMOS transistor PTr11 are electrically connected to the first metal layer 206 via contacts not illustrated in the drawings. Furthermore, the diffusion layers and the gate electrodes are electrically connected to the second metal layer 208, third metal layer 210, fourth metal layer 214, and fifth metal layer 216 via through holes 210a, 219b, 219c, and 219e. That is, the drains of the unillustrated NMOS transistor and PMOS transistor which constitute the inverter INV34 are electrically connected to the reflective electrode PE.

Furthermore, a passivation film (PSV) 217 serving as a protective film is formed on the reflective electrode PE (the fifth metal layer 216) and is arranged separately from and opposite to a common electrode CE that is a transparent electrode. A space between the reflective electrode PE and the common electrode CE is filled and sealed with the liquid crystal LCM and the liquid crystal display element LC is thereby formed.

An electrode 212 is formed on the third metal layer 210 via the interlayer insulator 205. This electrode 212, the third metal layer 210, and the interlayer insulator 205 between the electrode 212 and third metal layer 210 constitute the capacitance C2.

When the capacitance C2 is composed of MIM, the second signal holding circuit SM32, the switch SW31, and the switch SW32 can be composed of the transistors on the silicon substrate 200 and the wirings of the first metal layer 206 and second metal 208 layer. Furthermore, the first signal holding circuit DM31 can be composed of MIM wiring utilizing the third metal layer 210 above the transistors.

The electrode 212 is electrically connected to the fourth metal layer 214 via a through hole 219*d*. Furthermore, the fourth metal layer 214 is electrically connected to the switches SW31 and SW32 at locations not illustrated in the drawings.

Light from a light source not illustrated in the drawings is transmitted through the common electrode CE and liquid crystal LCM, is incident on and is reflected by the reflective electrode PE (the fifth metal layer 216), runs in reverse through the path the light came from, and passes through the common electrode CE to be output.

In the pixel Pix4, the first signal holding circuit DM31, the second signal holding circuit SM32, and the reflective electrode PE can be effectively arranged in the height direction by allocating the fifth metal layer 216 to the reflective electrode PE, as illustrated in FIG. 15. Therefore, the pixel Pix4 can be downsized. The pixel Pix4 thereby can be composed of a pixel having a pitch of 3 μm or less, for example, with transistors of a power source voltage of 3.3 V. The pixel having the 3 μm pitch can provide a liquid crystal display panel having a diagonal length of 0.55 inches, 4000 pixels in the horizontal direction, and 2000 pixels in the vertical direction.

The pixel Pix4 performs operation similar to the operation described with respect to the third embodiment by reference to the timing chart in FIG. 9.

Firstly, the switches SW31 in the pixels Pix4 of one row selected by the normal row scan pulse and the inverted row scan pulse output from the timing generator 62 are turned on by the normal row scan pulse and inverted row scan pulse. The normal gradation data in the subframe output to the column data line d are then sampled by the switches SW31 and written into the first signal holding circuits DM31. Similarly, the normal gradation data in the subframe are written into the first signal holding circuits DM31 of all of the pixels Pix4 which constitute the image display unit 61. At a time after this writing operation is ended, the normal trigger pulse TRIG at the "H" level and the inverted trigger pulse TRIGB at the "L" level are concurrently supplied to all of the pixels Pix4 which constitute the image display unit 61.

The switches SW32 in all of the pixels Pix4 are thereby turned on. Therefore, the normal gradation data in the subframe stored in the first signal holding circuits DM31 are transferred at once to the second signal holding circuits SM32 via the switches SW32, and are held by the second signal holding circuits SM32. The normal gradation data in the subframe are also applied to the reflective electrodes PE. A period for which the normal gradation data in the subframe are held by the second signal holding circuits SM32 is a period of one subframe until the next normal trigger pulse TRIG at the "H" level and the next inverted trigger pulse TRIGB at the "L" level are input.

Subsequently, the pixels Pix4 in the image display unit 61 are selected every rows by the normal row scan pulses and the inverted row scan pulses, similarly to the above. Then the inverted gradation data in the subframe which has a logically inverted value of the previous normal gradation data in the subframe is written into the first signal holding circuits DM31. When the writing of the inverted gradation data in the subframe into the first signal holding circuits DM31 of all of the pixels Pix4 in the image display unit 61 is ended, the normal trigger pulse TRIG at the "H" level and the inverted trigger pulse TRIGB at the "L" level are concurrently supplied to all of the pixels Pix4.

The switches SW32 in all of the pixels Pix4 are thereby turned on. Therefore, the inverted gradation data in the subframe stored in the first signal holding circuits DM31 are transferred at once to the second signal holding circuits SM32 via the switches SW32, and are held by the second signal holding circuits SM32. The inverted gradation data in the subframe are also applied to the reflective electrodes PE. A period for which the inverted gradation data in the subframe are held by the second signal holding circuits SM32 is a period of one subframe until the next normal trigger pulse TRIG at the "H" level and the inverted trigger pulse TRIGB at the "L" level are input.

Conclusion

The pixel Pix4 has effects similar to those of the pixels Pix1 to Pix3 of the third to fifth embodiments.

In addition, the pixel Pix4 has an effect of downsizing.

Seventh Embodiment

Figure 16:
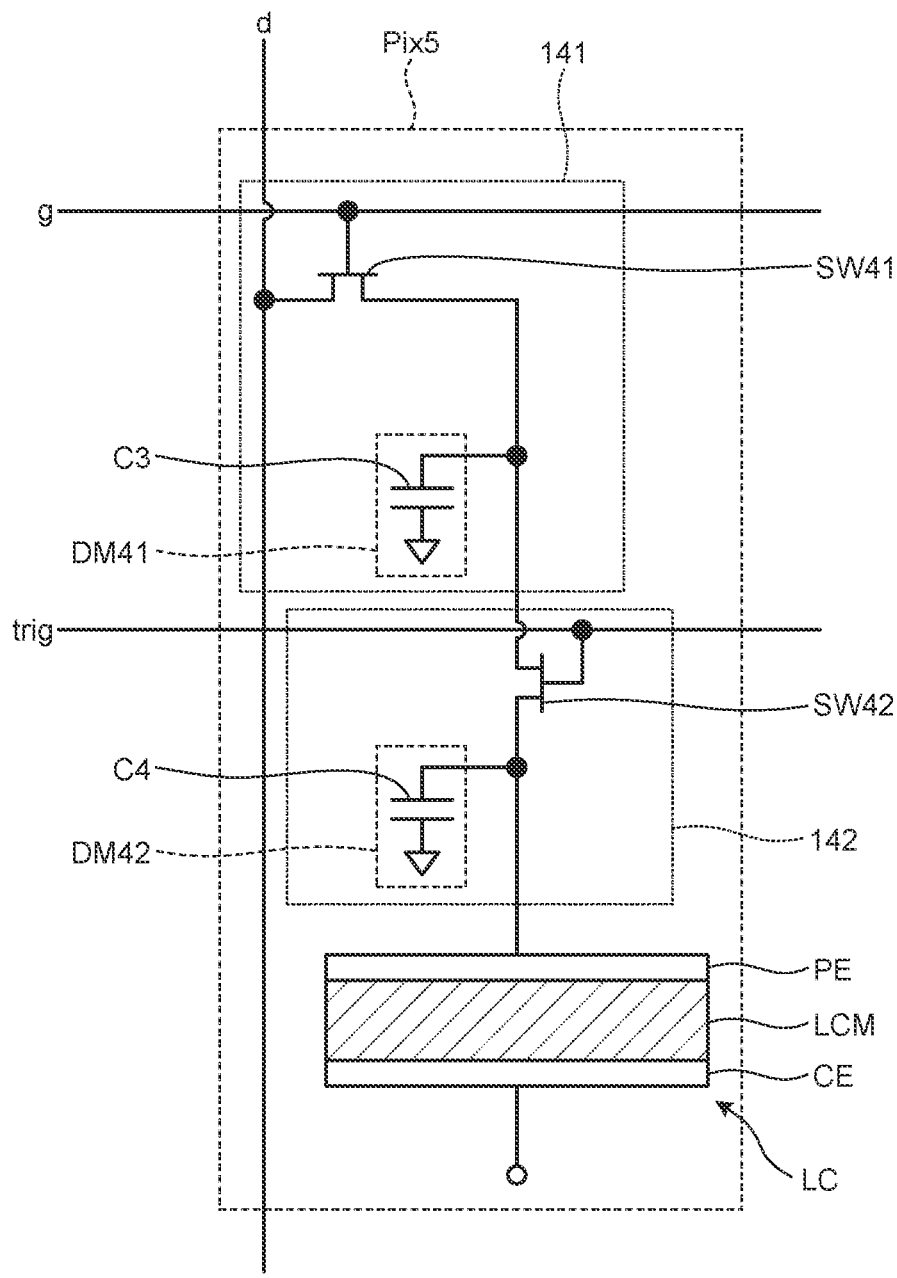
FIG. 16 is a diagram illustrating a circuit configuration of a pixel of a reflective liquid crystal display device of a seventh embodiment.

FIG. 16 is a diagram illustrating a circuit configuration of a pixel of a reflective liquid crystal display device of a seventh embodiment.

The same reference signs will be assigned to components of a pixel Pix5 of the reflective liquid crystal display device of the seventh embodiment that are the same as those of the pixels Pix1 to Pix4 of the third to sixth embodiments and description thereof will be omitted.

The pixel Pix5 is provided at an intersection between any one column data line d and any one row scan line g.

The pixel Pix5 includes a first memory 141, a second memory 142, and a liquid crystal display element LC. The first memory 141 includes a switch SW41 and a first signal holding circuit DM41. The second memory 142 includes a switch SW42 and a second signal holding circuit DM42.

Each of the first memory 141 and second memory 142 in the pixel Pixy is composed of a DRAM.

The switch SW41 corresponds to an example of the "first switching circuit" of the present application. The first signal holding circuit DM41 corresponds to an example of the "first signal holding circuit" of the present application. The first memory 141 corresponds to an example of the "first dynamic random access memory" of the present application. The switch SW42 corresponds to an example of the "second switching circuit" of the present application. The second signal holding circuit DM42 corresponds to an example of the "second signal holding circuit" of the present application. The second memory 142 corresponds to an example of a "second dynamic random access memory" of the present application.

The switch SW41 is composed of an NMOS transistor having a gate connected to the row scan line g, a drain connected to the column data line d, and a source connected to the first signal holding circuit DM41.

The first signal holding circuit DM41 is composed of a capacitance C3. A case in which the gradation data in the column data line d and the gradation data in the first signal holding circuit DM41 are different from each other will now be considered. When the switch SW41 has been turned on and the gradation data in the column data line d has been transferred to the first signal holding circuit DM41, the gradation data in the first signal holding circuit DM41 needs to be rewritten by the gradation data in the column data line d.

When the gradation data in the capacitance C3 which constitutes the first signal holding circuit DM41 is to be rewritten, the gradation data is changed by charging or discharging. When the gradation data in the column data line d is to be transferred to the capacitance C3, the gradation data is written by transferring an electric charge between the data line capacitance of the column data line d and the capacitance C3. A capacitance ratio of the data line capacitance of the column data line d to the capacitance C3 is usually large at about 1000:1. Therefore, in the pixel Pixy, the gradation data in the capacitance C3 can be rewritten infallibly.

The switch SW42 is composed of an NMOS transistor having a gate connected to a trigger line trig, a drain connected to the first signal holding circuit DM41, and a source connected to the second signal holding circuit DM42 and a reflective electrode PE.

The second signal holding circuit DM42 is composed of a capacitance C4. A case in which the gradation data in the first signal holding circuit DM41 and the gradation data in the second signal holding circuit DM42 are different from each other will now be discussed. When the switch SW42 has been turned on and the capacitance C3 and the capacitance C4 have been electrically connected to each other, the gradation data in the second signal holding circuit DM42 needs to be rewritten by the gradation data in the first signal holding circuit DM41.

When an electric charge level in the capacitance C3 (the gradation data in the first signal holding circuit DM41) and an electric charge level in the capacitance C4 (the gradation data in the second signal holding circuit DM42) are different from each other, an electric charge neutralization occurs. Therefore, the capacitance C3 is made larger than the capacitance C4 according to the present application. That is, C3 >C4. For example, when the gradation data at the "H" level is held in the capacitance C3 and the gradation data at the "L" level is held in the capacitance C4, the electric charge neutralization occurs. However, with the relation of C3 >C4, even if this electric charge neutralization occurs, a voltage after the neutralization can be higher than a threshold voltage. That is, the gradation data at the "H" level can be written into the capacitance C4. Thus, in the pixel Pix5, the gradation data in the capacitance C4 can be infallibly rewritten by the gradation data in the capacitance C3.

The switches SW41 and SW42 may be composed of PMOS transistors. In this case, polarities opposite to those in the description above are applicable and illustration and description thereof will thus be omitted.

Furthermore, each of the switches SW41 and SW42 may be a transmission gate composed of a PMOS transistor and an NMOS transistor.

The pixel Pix5 has an effect of downsizing. The first reason for this is as follows. The pixel Pix5 is composed of two transistors in total and the two capacitances C3 and C4. That is, the pixel Pix5 can be composed of a smaller number of elements than the pixel Pix1 (twelve transistors in total), the pixel Pix2 (ten transistors in total), the pixel Pix3 (seven transistors in total and one capacitance), and the pixel Pix4 (eight transistors in total and one capacitance). The second reason is that as described hereinafter, the first signal holding circuit DM41, the second signal holding circuit DM42, and the reflective electrode PE can be effectively arranged in a height direction of the elements.

Figure 17:
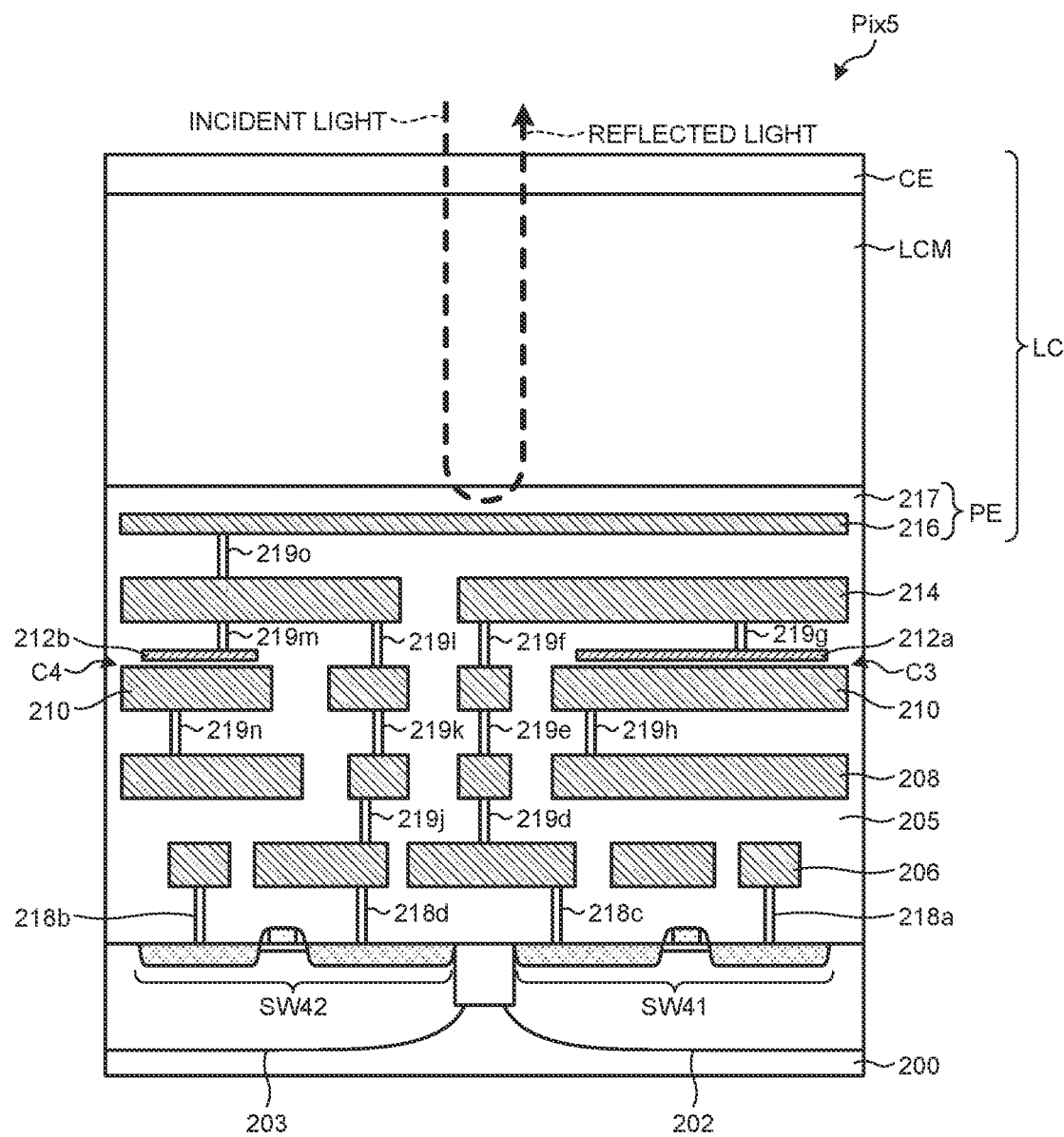
FIG. 17 is a diagram illustrating a sectional configuration of the pixel of the reflective liquid crystal display device of the seventh embodiment.

FIG. 17 is a diagram illustrating a sectional configuration of the pixel of the reflective liquid crystal display device of the seventh embodiment.

An MIM capacitance, a diffusion capacitance, or a PIP capacitance, for example, may be used as each of the capacitances C3 and C4. FIG. 17 illustrates a sectional configuration of the reflective liquid crystal display device when each of the capacitances C3 and C4 is composed of MIM of the above examples.

In FIG. 17, the NMOS transistor of the switch SW41 is formed on a P well 202 formed in a silicon substrate 200. The drain of the NMOS transistor of the switch SW41 is electrically connected to the column data line d (not illustrated in this figure) via a contact 218a and a first metal layer 206.

Furthermore, the NMOS transistor of the switch SW42 is formed on a P well 203 formed in the silicon substrate 200. The drain of the NMOS transistor of the switch SW42 is electrically connected to the source of the NMOS transistor of the switch SW41 via a contact 218b and the first metal layer 206.

Furthermore, the first metal layer 206, second metal layer 208, third metal layer 210, an electrode 212, fourth metal layer 215, and fifth metal layer 216 are layered over the NMOS transistor of the switch SW41 and the NMOS transistor of the switch SW42 with an interlayer insulator 205 being interposed between these metal layers. The fifth metal layer 216 constitutes the reflective electrode PE formed in each pixel.

Furthermore, a passivation film (PSV) 217 serving as a protective film is formed on the reflective electrode PE (the fifth metal layer 216) and is arranged separately from and opposite to a common electrode CE that is a transparent electrode. A space between the reflective electrode PE and the common electrode CE is filled and sealed with the liquid crystal LCM and the liquid crystal display element LC is thereby formed.

Electrodes 212a and 212b are formed on the third metal layer 210 via the interlayer insulator 205. This electrode 212a, the third metal layer 210, and the interlayer insulator 205 between the electrode 212a and third metal layer 210 constitute the capacitance C3. The electrode 212b, the third metal layer 210, and the interlayer insulator 205 between the electrode 212b and third metal layer 210 constitute the capacitance C4.

The electrode 212a is larger than the electrode 212b. The capacitance C3 thereby becomes larger than the capacitance C4. That is, C3>C4.

When each of the capacitances C3 and C4 is composed of MIM, each of the switch SW41 and the switch SW42 can be composed of the transistors on the silicon substrate 200 and the wirings of the first metal layer 206 and the second metal layer 208. Furthermore, each of the first signal holding circuit DM41 and second signal holding circuit DM42 can be composed of MIM wiring utilizing the third metal layer 210 above the transistors.

The source of the NMOS transistor of the switch SW41 is electrically connected to the electrode 212a via a contact 218c and through holes 219d, 219e, 219f, and 219g. The third metal layer 210 facing the electrode 212a is electrically connected to the reference potential (the ground potential) via a through hole 219h.

The source of the NMOS transistor of the switch SW42 is electrically connected to the electrode 212b via a contact 218d and through holes 219j, 219k, 219l, and 219m. The third metal layer 210 facing the electrode 212b is electrically connected to the reference potential (the ground potential) via a through hole 219n. The electrode 212b is electrically connected to the reflective electrode PE via the through hole 219m and a through hole 219o.

Light from a light source not illustrated in the drawings is transmitted through the common electrode CE and the liquid crystal LCM, is incident on and is reflected by the reflective electrode PE (the fifth metal layer 216), runs in reverse through the path the light came from, and passes through the common electrode CE to be output.

In the pixel Pix5, the first signal holding circuit DM41, the second signal holding circuit DM42, and the reflective electrode PE can be effectively arranged in the height direction by allocating the fifth metal layer 216 to the reflective electrode PE as illustrated in FIG. 17. Therefore, the pixel Pix5 can be downsized. The pixel Pix5 thereby can be composed of a pixel having a pitch of 3 µm or less, for example, with transistors of a power source voltage of 3.3 V. The pixel having the 3 µm pitch can provide a liquid crystal display panel having a diagonal length of 0.55 inches, 4000 pixels in the horizontal direction, and 2000 pixels in the vertical direction.

The pixel Pix5 performs operation similar to the operation described with respect to the third embodiment by reference to the timing chart in FIG. 9.

Firstly, the switches SW14 in the pixels Pix5 of one row selected by the normal row scan pulse output from the timing generator 62 are turned on by the normal row scan pulse. The normal gradation data in the subframe output to the column data line d are then sampled by the switches SW41 and written into the first signal holding circuits DM41. Similarly, the normal gradation data in the subframe are written into the first signal holding circuits DM41 of all of the pixels Pix5 which constitute the image display unit 61. At a time after this writing is ended, the normal trigger pulse TRIG at the "H" level is supplied concurrently to all of the pixels Pix5 which constitute the image display unit 61.

The switches SW42 in all of the pixels Pix5 are thereby turned on. Therefore, the normal gradation data in the subframe stored in the first signal holding circuits DM41 are transferred at once to the second signal holding circuits DM42 via the switches SW42 and are held by the second signal holding circuits DM42.

The normal gradation data in the subframe are also applied to the reflective electrodes PE. A period for which the normal gradation data in the subframe are held by the second signal holding circuits DM42 is a period of one subframe until the next normal trigger pulse TRIG at the "H" level is input.

Subsequently, the pixels Pix5 in the image display unit 61 are selected every rows by the normal row scan pulses similarly to the above, and the inverted gradation data in the subframe which has a logically inverted value of the previous normal gradation data in the subframe are written into the first signal holding circuits DM41. When writing of the inverted gradation data in the subframe into the first signal holding circuits DM41 of all of the pixels Pix5 which constitute the image display unit 61 is ended, the normal trigger pulse TRIG at the "H" level is supplied concurrently to all of the pixels Pix5 which constitute the image display unit 61.

The switches SW42 in all of the pixels Pix5 are thereby turned on. Therefore, the inverted gradation data in the subframe stored in the first signal holding circuits DM41 are transferred at once to the second signal holding circuits DM42 via the switches SW42, and are held by the second signal holding circuits DM42. The inverted gradation data in the subframe are also applied to the reflective electrodes PE. A period for which the inverted gradation data in the subframe are held by the second signal holding circuits DM42 is a period of one subframe until the next normal trigger pulse TRIG at the "H" level is input.

Conclusion

The pixel Pix5 has effects similar to those of the pixels Pix1 to Pix4 of the third to sixth embodiments.

In addition, the pixel Pix5 has an effect of downsizing. The pixel Pix5 can be further downsized as compared with the pixels Pix1 to Pix4 although the electric discharge neutralization described above may occur and noise resistance is lower than that with SRAMs. Therefore, which type of the pixels Pix1 to Pix5 is to be adopted may be determined according to specifications (for example, priority on downsizing or priority on noise resistance) required for the reflective liquid crystal display device 13.

Notes

Pixels of a portion 13a on which multiple wavelength channels that have been diffused are incident of the reflective liquid crystal display device 13 illustrated in FIG. 3 are inverted every subframes. However, pixels of a portion (a frame portion) 13b on which the multiple wavelength channels that have been dispersed are not incident does not need to be inverted every subframes. In terms of power consumption, a frequency of the inversion is preferably reduced.

The common electrode CE may thus be divided into a portion 13a and a portion 13b for separate driving thereof, and a frequency of the inversion may be reduced in the portion 13b. In this case, the inversion may be performed every subframes in the portion 13a but the inversion may be not performed in a predetermined number of the subframes (in other words, the inversion may be performed every several subframes of a predetermined number) in the portion 13b.

In this case, when the pixel in the portion 13b has a configuration like the pixel Pix3 (see FIG. 12), the potential of the reflective electrodes PE is decreased if any leakage of electric charge from the capacitances C1 occurs. Therefore, preferably, the normal trigger pulse TRIG and the inverted trigger pulse TRIGB are turned on at a fixed interval for rewriting operation into the capacitances C1. Or, the predetermined number of the subframes for the inversion is preferably reduced from those for other pixel circuit configurations.

Furthermore, writing into the first memories of the portion 13b is preferably performed immediately before the inversion as far as possible. The reason is that when contents of the first memory 111 and the second memory 121 are in an inverted state, a leakage current is generated through the switch SW21 and power consumption is increased.

According to the configuration of the pixel Pix1 (see FIG. 6), since the writing into the first memory 91 can be performed the fastest, the content of the first memory 91 is thus preferably rewritten the most recently.

The technical scope of embodiments are not limited to the embodiments described above and modifications may be made as appropriate without departing from the gist of the embodiments.

An optical node device according to the present embodiments is applicable to, for example, an optical network.

According to the present embodiments, reliability can be improved.

Although the application has been described with respect to specific embodiments for a complete and clear application, the appended claims are not to be thus limited but are to be construed as embodying all modifications and alternative constructions that may occur to one skilled in the art that fairly fall within the basic teaching herein set forth.

The invention claimed is:

1. An optical node device, comprising:
   an input and output unit having an input port on which incident light is incident and an output port from which output light according to each wavelength included in the incident light is output;
a wavelength disperser configured to spatially disperse light of each wavelength included in the incident light according to the wavelength and output the output light toward the input and output unit;
an optical coupler configured to condense the light of each wavelength dispersed by the wavelength disperser onto a two-dimensional plane for each wavelength and output reflected light of each wavelength to the wavelength disperser;
a spatial light modulator that is arranged at a position of the two-dimensional plane, has multiple pixels, and configured to reflect, by representing gradation by the multiple pixels, the light of each wavelength condensed by the optical coupler in directions for each wavelength determined by routing;
a spatial light modulator drive unit configured to drive the multiple pixels of the spatial light modulator; and
a common electrode which is divided into a first common electrode of a first portion on which light is incident and a second common electrode of a second portion on which light is not incident, wherein
the gradation is formed by inputting normal gradation data in one subframe period of multiple subframe periods which are obtained by dividing one frame period and inverted gradation data in another subframe period of the multiple subframe periods into each of the multiple pixels by the spatial light modulator drive unit,
each of the multiple pixels comprises:
  a first switching circuit configured to sample the normal gradation data or the inverted gradation data from a data line;
  a first signal holding circuit configured to hold the normal gradation data or the inverted gradation data sampled by the first switching circuit;
  a second switching circuit configured to sample, at a common timing to all of the multiple pixels, the normal gradation data or the inverted gradation data held in the first signal holding circuit; and
  a second signal holding circuit configured to hold, for one subframe period, the normal gradation data or the inverted gradation data sampled by the second switching circuit and apply the normal gradation data or the inverted gradation data to a reflective electrode of a liquid crystal display element, and
the spatial light modulator drive unit is further configured to:
  in the first portion, apply alternating current voltage having a positive polarity and a negative polarity to a liquid crystal of the liquid crystal display element by inverting a voltage in the first common electrode of the liquid crystal display element at the common timing; and
  supply a voltage having an amplitude different from an amplitude between the normal gradation data and the inverted gradation data to the first common electrode, and
  in the second portion, voltages of the reflective electrode and the second common electrode are inverted every several subframes of a predetermined number.

2. The optical node device according to claim 1, wherein the first switching circuit and the first signal holding circuit constitute a first static random access memory, the second switching circuit and the second signal holding circuit constitute a second static random access memory, and a driving force of a transistor which constitutes the first signal holding circuit is larger than a driving force of a transistor which constitutes the second signal holding circuit.

3. The optical node device according to claim 1, wherein
the first switching circuit and the first signal holding circuit constitute a first static random access memory,
the second switching circuit and the second signal holding circuit constitute a second static random access memory,
each of the first switching circuit and the second switching circuit is composed of one transistor,
the first signal holding circuit is composed of a first inverter and a second inverter, an output terminal of one of the first inverter and the second inverter being connected to an input terminal of the other of the first inverter and the second inverter,
the second signal holding circuit includes a third inverter and a fourth inverter, an output terminal of one of the third inverter and the fourth inverter being connected to an input terminal of the other of the third inverter and the fourth inverter,
a driving force of a transistor which constitutes the first inverter at an input end as viewed from the first switching circuit is larger than a driving force of the transistor which constitutes the second inverter at an output end as viewed from the first switching circuit, and
a driving force of a transistor which constitutes the third inverter at an input end as viewed from the second switching circuit is larger than a driving force of the transistor which constitutes the fourth inverter at an output end as viewed from the second switching circuit.

4. The optical node device according to claim 3, wherein a driving force of the transistor which constitutes the first switching circuit is larger than the driving force of the transistor which constitutes the second inverter, and a driving force of the transistor which constitutes the second switching circuit is larger than the driving force of the transistor which constitutes the fourth inverter.

5. The optical node device according to claim 1, wherein
the first switching circuit and the first signal holding circuit constitute a first static random access memory,
the second switching circuit and the second signal holding circuit constitute a first dynamic random access memory, and
the second signal holding circuit is composed of a capacitance.

6. The optical node device according to claim 5, wherein the second switching circuit is a complementary switching circuit composed of a P-channel transistor and an N-channel transistor.

7. The optical node device according to claim 5, wherein
the first signal holding circuit is composed of a first inverter and a second inverter, an output terminal of one of the first inverter and the second inverter being connected to an input terminal of the other of the first inverter and the second inverter, and
a driving force of a transistor which constitutes the first inverter at an input end as viewed from the first switching circuit is larger than a driving force of a transistor which constitutes the second inverter at an output end as viewed from the first switching circuit.

8. The optical node device according to claim 7, wherein
the first switching circuit is composed of one transistor, and
a driving force of the transistor included in the first switching circuit is larger than the driving force of the transistor which constitutes the second inverter.

9. The optical node device according to claim 1, wherein
the first switching circuit and the first signal holding circuit constitute a first dynamic random access memory,
the second switching circuit and the second signal holding circuit constitute a first static random access memory, and
the first signal holding circuit is composed of a capacitance.

10. The optical node device according to claim 9, wherein the first switching circuit is a complementary switching circuit composed of a P-channel transistor and an N-channel transistor.

11. The optical node device according to claim 9, wherein the first switching circuit is composed of one transistor.

12. The optical node device according to claim 9, wherein
the second signal holding circuit is composed of a first inverter and a second inverter, an output terminal of one of the first inverter and the second inverter being connected to an input terminal of the other of the first inverter and the second inverter, and
a driving force of a transistor which constitutes the first inverter at an input end as viewed from the second switching circuit is larger than a driving force of a transistor which constitutes the second inverter at an output end as viewed from the second switching circuit.

13. The optical node device according to claim 9, wherein the second switching circuit is a complementary switching circuit composed of a P-channel transistor and an N-channel transistor.

14. The optical node device according to claim 9, wherein the second switching circuit is composed of one transistor.

15. The optical node device according to claim 1, wherein
the first switching circuit and the first signal holding circuit constitute a first dynamic random access memory,
the second switching circuit and the second signal holding circuit constitute a second dynamic random access memory, and
each of the first signal holding circuit and the second signal holding circuit is composed of a capacitance.

16. The optical node device according to claim 15, wherein the first switching circuit is composed of one transistor.

17. The optical node device according to claim 15, wherein the first switching circuit is a complementary switching circuit composed of a P-channel transistor and an N-channel transistor.

18. The optical node device according to claim 15, wherein the second switching circuit is composed of one transistor.

19. The optical node device according to claim 15, wherein the second switching circuit is a complementary switching circuit composed of a P-channel transistor and an N-channel transistor.

20. The optical node device according to claim 1, wherein the gradation data is written in the first signal holding circuit in the second portion just before the voltages of the reflective electrode and the second common electrode are inverted.

* * * * *